US011137489B2

(12) United States Patent
Starzer et al.

(10) Patent No.: US 11,137,489 B2
(45) Date of Patent: Oct. 5, 2021

(54) RADAR FRONT-END WITH RF OSCILLATOR MONITORING

(71) Applicant: Infineon Technologies AG, Neubiberg (DE)

(72) Inventors: Florian Starzer, Ennsdorf Bei Enns (AT); Helmut Kollmann, Linz (AT); Alexander Melzer, Neutillmitsch (AT); Rainer Stuhlberger, Puchenau (AT); Roland Vuketich, Arbing (AT); Mathias Zinnoecker, Linz (AT)

(73) Assignee: Infineon Technologies AG ( * ) Notice: Subject to any disclaimer, the term of this patent is extended or adjusted under 35 U.S.C. 154(b) by 13 days.

(21) Appl. No.: 16/870,227

(22) Filed: May 8, 2020

(65) Prior Publication Data

US 2020/0301001 A1 Sep. 24, 2020

Related U.S. Application Data

(62) Division of application No. 16/105,111, filed on Aug. 20, 2018, now Pat. No. 10,684,363.

(30) Foreign Application Priority Data

Aug. 18, 2017 (DE) .......................... 102017118987.4
Jul. 22, 2018 (DE) .......................... 102018117688.0

(51) Int. Cl.
*G01S 13/34* (2006.01)
*G01S 7/35* (2006.01)
(Continued)

(52) U.S. Cl.
CPC ............ *G01S 13/343* (2013.01); *G01S 7/352* (2013.01)

(58) Field of Classification Search
CPC ...... H04B 1/40; H04B 1/0082; H04B 7/0871; H04B 15/06; H04W 48/18;
(Continued)

(56) References Cited

U.S. PATENT DOCUMENTS 10,566,956 B2 * 2/2020 Reuter .................... G01S 7/032
10,620,305 B2 * 4/2020 Comic .................. G01S 7/4021
(Continued)

FOREIGN PATENT DOCUMENTS

DE     102018117202 B3 *  1/2020  ............. G01S 7/032
WO     WO-2005086631 A2 *  9/2005  ............. G01S 7/032

*Primary Examiner* — Mohammed Rachedine
(74) *Attorney, Agent, or Firm* — Design IP

(57) ABSTRACT

A radar system includes a first chip having a first radio frequency (RF) contact; a second chip having a second RF contact; a first RF oscillator integrated in the first chip and has an output coupled to the first RF contact; a second RF oscillator integrated in the second chip; a transmission line connecting the first RF contact to the second RF contact; a demodulator that is arranged in the second chip and has a first RF input; wherein the first RF oscillator is configured to generate a first RF oscillator signal that is transmitted to the first RF input of the demodulator via the first RF contact, the transmission line, and the second RF contact, and wherein a controller is configured to determine a first propagation delay of the first RF oscillator signal arriving at the second chip on a basis of information obtained from the demodulator.

8 Claims, 11 Drawing Sheets

(51) Int. Cl.
    *G01S 13/87*     (2006.01)
    *G01S 13/931*     (2020.01)
    *G01S 7/40*     (2006.01)
    *G01S 7/03*     (2006.01)
    *G01S 13/42*     (2006.01)

(58) Field of Classification Search
    CPC ...... H04W 52/0274; G01S 7/40; H01L 22/34;
        H01L 23/481; H01L 25/0657; H03L 7/07;
                                H04L 25/08
    See application file for complete search history.

(56)             References Cited

U.S. PATENT DOCUMENTS

| | | | |
|---|---|---|---|
| 10,775,489 B2* | 9/2020 | Rao | G01S 7/354 |
| 2009/0081976 A1* | 3/2009 | Fujii | H04B 1/0082 |
| | | | 455/209 |
| 2016/0173215 A1* | 6/2016 | Laaser | H04B 15/06 |
| | | | 370/201 |
| 2019/0235051 A1* | 8/2019 | Melzer | G01S 7/032 |
| 2020/0300965 A1* | 9/2020 | Wu | G01S 13/931 |

* cited by examiner

RADAR FRONT-END WITH RF OSCILLATOR MONITORING

CROSS-REFERENCE TO RELATED APPLICATIONS

This application is a divisional of U.S. patent application Ser. No. 16/105,111 filed on Aug. 20, 2018, which claims the benefit of German Patent Application No. 102017118987.4 filed on Aug. 18, 2017 and German Patent Application No. 102018117688.0 filed on Jul. 22, 2018, which are incorporated by reference as if fully set forth.

FIELD

The present description relates to the field of radio-frequency (RF) circuits. Some exemplary embodiments relate to a radar chip which is suitable for being cascaded with another radar chip.

BACKGROUND

Radio-frequency (RF) transmitters and receivers are found in a multiplicity of applications, in particular in the field of wireless communication and radar sensors. In the automotive sector, there is an increasing need for radar sensors which are used in so-called adaptive cruise control (ACC, or Radar Cruise Control) systems. Such systems can automatically adapt the speed of an automobile in order to thus maintain a safe distance to other automobiles traveling in front (and from other objects and pedestrians). Further applications in the automotive sector are, for example, blind spot detection, lane change assist and the like.

Modern radar systems use highly integrated RF circuits which can combine all core functions of an RF front-end of a radar transceiver in a single housing (single-chip radar transceiver), which is often referred to as a monolithic microwave integrated circuit (MMIC). Such RF front-ends usually comprise, inter alia, a voltage-controlled oscillator (VCO) connected in a phase-locked loop, power amplifiers (PA), directional couplers, mixers and analog-to-digital converters (ADC) as well as associated control circuit arrangements for controlling and monitoring the RF front-end.

Modern frequency-modulated continuous-wave (FMCW) radar systems are often multi-input/multi-output (MIMO) systems having a plurality of transmission (TX) and reception (RX) channels. MIMO systems usually comprise a plurality of MMICs which are arranged on a carrier board (PCB, printed circuit board) and must operate in a synchronous manner, wherein each MMIC per se may have a plurality of RX and TX channels. One object may be considered to be the (in-phase) synchronization of an MIMO radar system having a plurality of MMICs.

SUMMARY

A radar method is described. According to one exemplary embodiment, the method includes generating a first RF oscillator signal in a first chip and supplying the first RF oscillator signal to a transmission (TX) channel of the first chip and transmitting the first RF oscillator signal from the TX channel of the first chip to the second chip via a transmission line.

According to another exemplary embodiment, the method includes generating a first RF oscillator signal in a first chip and supplying the first RF oscillator signal to a transmission (TX) channel of the first chip. The method also includes generating a second RF oscillator signal in a second chip and transmitting the first RF oscillator signal from the first chip to the second chip via a transmission line. The method also includes determining a first propagation delay of the first RF oscillator signal arriving at the second chip by means of demodulation using the second RF oscillator signal.

A radar chip is also described. According to one exemplary embodiment, the radar chip has: a local oscillator (LO) for generating an RF oscillator signal and at least one first TX channel which is connected to a pin of the MMIC. The TX channel can be configured both to output the RF oscillator signal via the pin of the first TX channel and to receive a further RF oscillator signal via the pin of the first TX channel.

A radar system is also described. According to one exemplary embodiment, the radar system includes a first chip and at least one second chip, wherein the first chip has an RF oscillator which is designed to generate an RF oscillator signal and to output it at a first RF output contact. The system also includes an RF splitter which is arranged on the carrier and has an input and a first output and at least one second output. A first transmission line connects the RF output contact of the first chip to the input of the RF splitter. A second transmission line connects the first output of the RF splitter to an RF input of the first chip and a third transmission line connects the second output of the RF splitter to an RF input of the second chip. In this case, the second and third transmission lines are configured in such a manner that they cause the same propagation delay during operation when transmitting the RF oscillator signal.

According to another exemplary embodiment, a radar system includes a first chip having a first RF contact and a second chip having a second RF contact as well as a first RF oscillator which is integrated in the first chip and has an output which is coupled to the first RF contact via at least one transmission (TX) channel. The system also includes a second RF oscillator which is integrated in the second chip, a transmission line which connects the first RF contact on the first chip to the second RF contact on the second chip and at least one first demodulator which is arranged in the second chip and has an RF input which is coupled to the second RF contact and a reference input which is coupled to an output of the second RF oscillator. The first RF oscillator is designed to generate a first RF oscillator signal which is transmitted to the RF input of the first demodulator via the first RF contact, the transmission line and the second RF contact. A control unit is designed to determine a first propagation delay of the first RF oscillator signal arriving at the second chip on the basis of information obtained from the first demodulator.

A method is also described and, according to one exemplary embodiment, includes: receiving a first RF oscillator signal via an RF chip contact of a radar chip; generating a second RF oscillator signal by means of an RF oscillator in the radar chip, wherein the first RF oscillator signal and the second RF oscillator signal have the same frequency and an adjustable phase shift relative to one another; generating a sum signal by superimposing the first RF oscillator signal and the second RF oscillator signal; and generating a plurality of measured values, which represent the power of the sum signal, for a plurality of phase shifts, wherein a phase shift is assigned to each of the measured values. Finally, a value representing the power of the first RF oscillator signal is determined on the basis of the plurality of measured values.

Another exemplary embodiment relates to an RF circuit having an RF chip contact of a radar chip for receiving an external first RF oscillator signal and a local oscillator which is arranged in the radar chip and is designed to generate a second RF oscillator signal, wherein the first RF oscillator signal and the second RF oscillator signal have the same frequency. The RF circuit also has a phase shifter which is designed to set a phase shift between the first and second oscillator signals, and an RF power detector which is arranged in the radar chip. The power detector has an input which is coupled to the RF chip contact and to an output of the local oscillator by means of a coupler, with the result that the first RF oscillator signal and the second RF oscillator signal are superimposed at the input of the RF power detector, with the result that the power detector measures the power of the superimposed signal.

BRIEF DESCRIPTION OF THE DRAWINGS

Exemplary embodiments are explained in more detail below using figures. The illustrations are not necessarily true to scale and the exemplary embodiments are not only restricted to the aspects illustrated. Rather, importance is placed on illustrating the principles on which the exemplary embodiments are based. In the figures:

FIG. 9A illustrates a signal flow from the master MMIC to the slave MMIC and FIG. 9B illustrates the reverse signal flow; and FIG. 9C illustrates a simplified version of FIG. 9B.

DETAILED DESCRIPTION

The following exemplary embodiments here are described in the context of a radar receiver. However, the various exemplary embodiments described here are not restricted to radar applications and can also be used in other areas, for example in RF transceivers of RF communication apparatuses. RF circuits from the wide variety of fields of application may have voltage-controlled oscillators (VCOs) for generating RF signals. Instead of VCOs, it is alternatively also possible to use digitally controlled oscillators (DCOs). The concepts described here can be readily easily applied to applications in which DCOs are used instead of VCOs.

Figure 1:
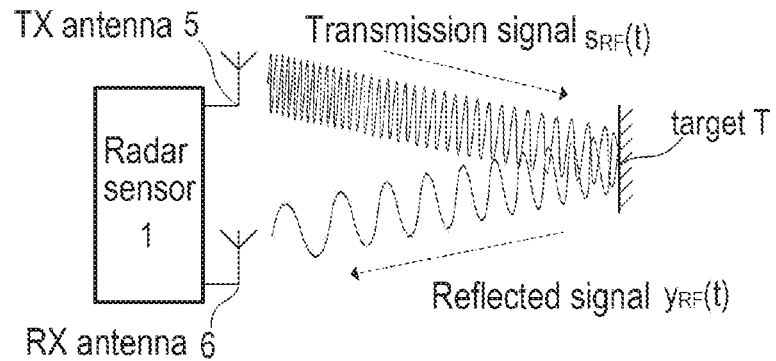
FIG. 1 is a sketch for illustrating the functional principle of an FMCW radar system for measuring distance and/or speed.

FIG. 1 illustrates the use of an FMCW radar system as a sensor for measuring distances and speeds of objects which are usually referred to as radar targets. In the present example, the radar apparatus 10 has separate transmission (TX) and reception (RX) antennas 5 and 6 (bistatic or pseudo-monostatic radar configuration). However, it is noted that it is also possible to use a single antenna which is simultaneously used as a transmission antenna and a reception antenna (monostatic radar configuration). The transmission antenna 5 emits a continuous RF signal $s_{RF}(t)$ which is frequency-modulated by means of a sawtooth signal (periodic linear ramp signal), for example. The emitted signal $s_{RF}(t)$ is scattered back at the radar target T and the back-scattered (reflected) signal $y_{RF}(t)$ is received by the reception antenna 6.

Figure 2:
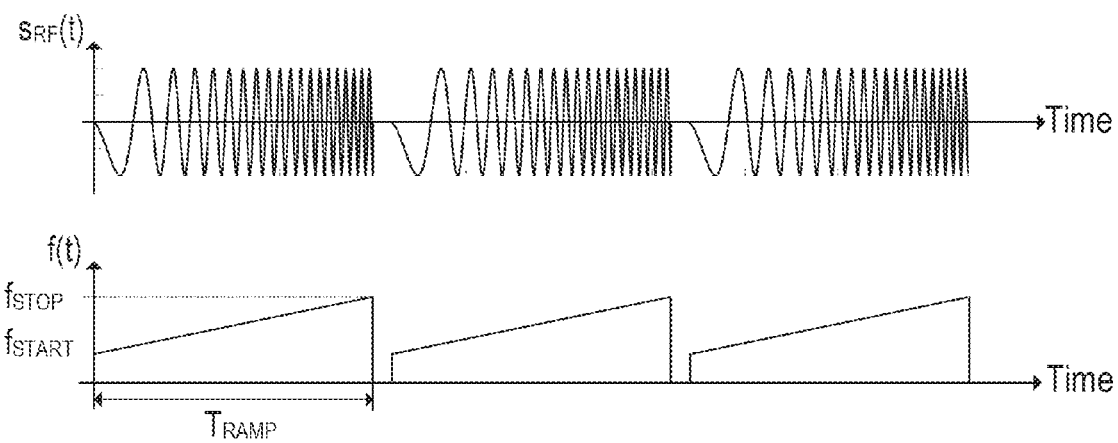
FIG. 2 comprises two timing diagrams for illustrating the frequency modulation of the RF signal generated by the FMCW system.

FIG. 2 illustrates, by way of example, the mentioned frequency modulation of the signal $s_{RF}(t)$. As illustrated in FIG. 2, the signal $s_{RF}(t)$ is composed of a set of "chirps", that is to say the signal $s_{RF}(t)$ comprises a sequence of sinusoidal signal profiles (waveforms) with a rising (up-chirp) or falling (down-chirp) frequency (see upper graph in FIG. 2). In the present example, the instantaneous frequency f(t) of a chirp linearly rises at a starting frequency $f_{START}$ beginning inside a period $T_{RAMP}$ to a stop frequency $f_{STOP}$ (see lower graph in FIG. 2). Such chirps are also referred to as a linear frequency ramp. FIG. 2 illustrates three identical linear frequency ramps. However, it is noted that the parameters $f_{START}$, $f_{STOP}$, $T_{RAMP}$ and the pause between the individual frequency ramps can vary. The frequency variation also need not necessarily be linear. Depending on the implementation, transmission signals with an exponential (exponential chirps) or hyperbolic (hyperbolic chirps) frequency variation can also be used.

Figure 3:
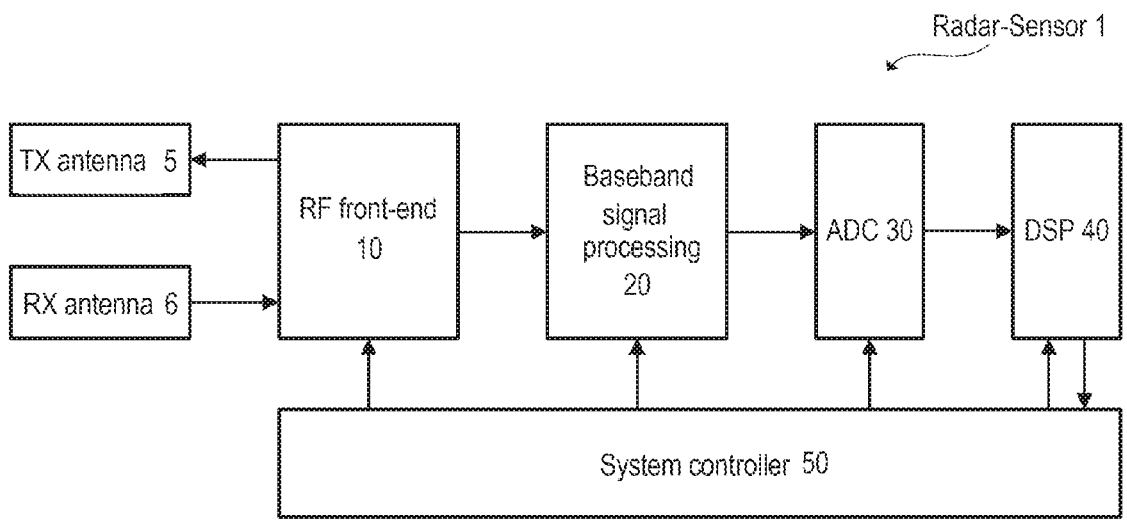
FIG. 3 is a block diagram for illustrating the fundamental structure of an FMCW radar system.

FIG. 3 is a block diagram which illustrates, by way of example, a possible structure of a radar apparatus 1 (radar sensor). Similar structures can also be found in RF transceivers, for example, which are used in other applications, for example wireless communication systems. Therefore, at least one transmission antenna 5 (TX antenna) and at least one reception antenna 6 (RX antenna) are connected to an RF front-end 10 which can comprise all those circuit components which are required for RF signal processing. These circuit components comprise, for example, a local oscillator (LO), RF power amplifiers, low-noise amplifiers (LNA), directional couplers (for example rat-race couplers, circulators, etc.) and mixers for down-mixing the RF signals to the baseband or an intermediate frequency band (IF band). The RF front-end 10 can be integrated—possibly together with further circuit components—in a monolithic microwave integrated circuit (MMIC). The illustrated example shows a bistatic (or pseudo-monostatic) radar system with separate RX and TX antennas. In the case of a monostatic radar system, a single antenna (or an antenna array) would be used both to emit and to receive the electromagnetic (radar) signals. In this case, a directional coupler (for example a circulator) can be used to separate the RF signals to be emitted into the radar channel from the RF signals (radar echoes) received from the radar channel.

In the case of a frequency-modulated continuous-wave radar system (FMCW radar system), the RF signals emitted via the TX antenna 5 may be, for example, in the range of approximately 20 GHz to 81 GHz (for example 77 GHz in some applications). As mentioned, the RF signal received by the RX antenna 6 comprises the radar echoes, that is to say those signal components which are scattered back at the so-called radar targets. The received RF signal $y_{RF}(t)$ is down-mixed to the baseband, for example, and is processed further in the baseband by means of analog signal processing (see FIG. 3, analog baseband signal processing chain 20). Said analog signal processing comprises substantially filtering and possibly amplification of the baseband signal. The baseband signal is finally digitized (see FIG. 3, analog-to-digital converter 30) and processed further in the digital range. The digital signal processing chain can be at least partially implemented as software which is executed on a processor (see FIG. 3, DSP 40). The overall system is generally controlled by means of a system controller 50 which can likewise be at least partially implemented as software which can be executed on a processor, for example a microcontroller. The RF front-end 10 and the analog baseband signal processing chain 20 (optionally also the analog-to-digital converter 30) can be integrated together in a single MMIC (that is to say an RF semiconductor chip). Alternatively, the individual components can also be distributed among a plurality of integrated circuits.

Figure 4:
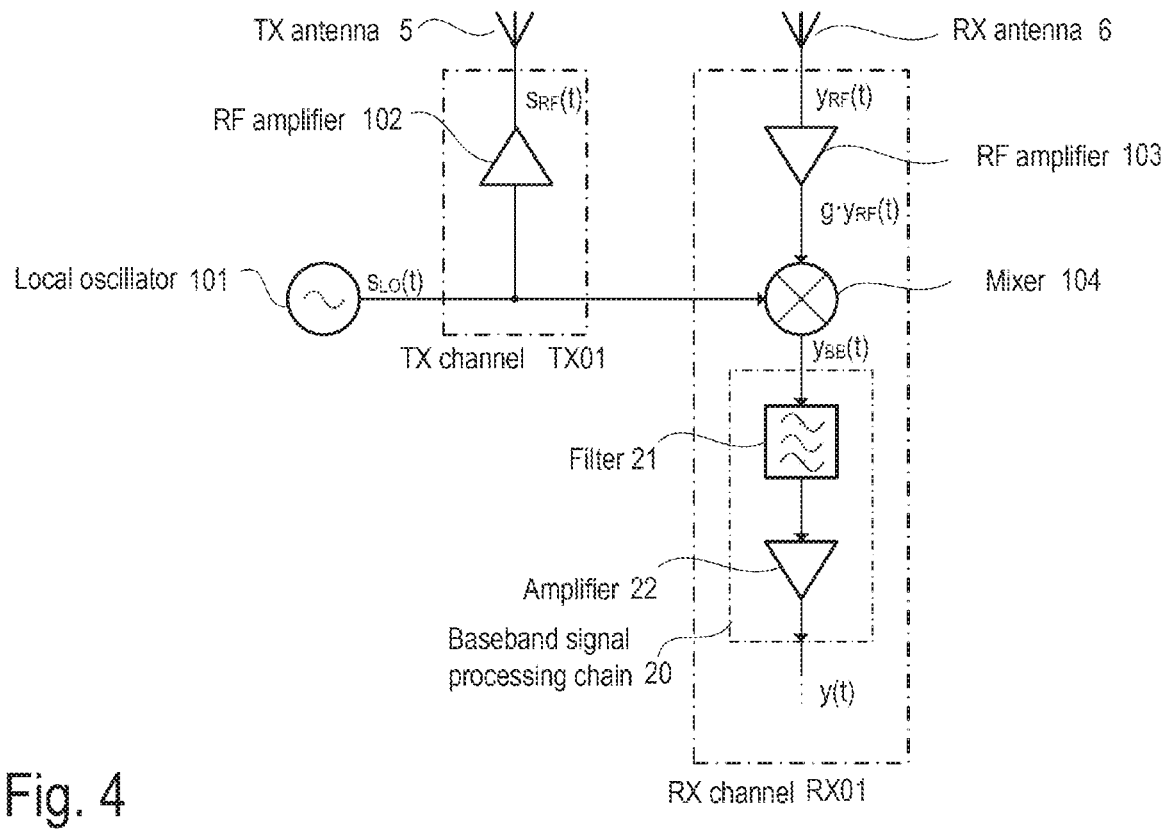
FIG. 4 is a block diagram for illustrating an example of an analog RF front-end of the FMCW radar system from FIG. 3.

FIG. 4 illustrates an exemplary implementation of the RF front-end 10 with a downstream baseband signal processing chain 20 which may be part of the radar sensor from FIG. 3. It is noted that FIG. 4 illustrates a simplified circuit diagram in order to show the fundamental structure of the RF front-end. Actual implementations which may depend greatly on the specific application may naturally be more complex. The RF front-end 10 comprises a local oscillator 101 (LO) which generates an RF signal $s_{LO}(t)$. As described above with reference to FIG. 3, the signal $s_{LO}(t)$ may be frequency-modulated and is also referred to as an LO signal. In radar applications, the LO signal is usually in the SHF (Super High Frequency, centimeter wave) or in the EHF (Extremely High Frequency, millimeter wave) band, for example in the range of 76 GHz to 81 GHz in automotive applications.

The LO signal $s_{LO}(t)$ is processed both in the transmission signal path and in the reception signal path. The transmission signal $s_{RF}(t)$ (cf. FIG. 2) which is emitted by the TX antenna 5 is generated by amplifying the LO signal $s_{LO}(t)$, for example by means of the RF power amplifier 102. The output of the amplifier 102 can be coupled to the TX antenna 5 (in the case of a bistatic or pseudo-monostatic radar configuration). The reception signal $y_{RF}(t)$ which is provided by the RX antenna 6 is supplied to the RF port of the mixer 104. In the present example, the RF reception signal $y_{RF}(t)$ (antenna signal) is preamplified by means of the amplifier 103 (gain g) and the amplified RF reception signal $g \cdot y_{RF}(t)$ is supplied to the mixer 104. The amplifier 103 may be an LNA, for example. The LO signal $s_{LO}(t)$ is supplied to the reference port of the mixer 104, with the result that the mixer 104 down-mixes the (preamplified) RF reception signal $y_{RF}(t)$ to the baseband. The down-mixed baseband signal (mixer output signal) is denoted $y_{BB}(t)$. This baseband signal $y_{BB}(t)$ is initially further processed in an analog manner, wherein the analog baseband signal processing chain 20 has substantially amplification (amplifier 22) and filtering (for example bandpass filter 21) in order to suppress undesired sidebands and image frequencies. The resulting analog output signal which can be supplied to an analog-to-digital converter is denoted y(t). Methods for the digital further processing of the output signal (digital radar signal) are known per se (for example the range-Doppler analysis) and are therefore not discussed any further here.

In the present example, the mixer 104 mixes the preamplified RF reception signal $g \cdot y_{RF}(t)$ (that is to say the amplified antenna signal) down to the baseband. The mixing can be carried out in one stage (that is to say from the RF band directly to the baseband) or via one or more intermediate stages (that is to say from the RF band to an intermediate frequency band and then to the baseband). In view of the example shown in FIG. 4, it becomes clear that the quality of a radar measurement depends greatly on the quality or accuracy and on the phase angle of the LO signal $s_{LO}(t)$. In particular, the phase of the LO signal $s_{LO}(t)$ supplied to the mixer 104 (as reference signal) is also important for an accurate measurement. In the case of multichannel radar systems having a plurality of reception channels (RX channels), the phase angle of the oscillator signals supplied to the RX channels as reference signals has a significant influence on the measurement of the angle of incidence (Direction of Arrival, DoA) of the received radar signals.

Figure 5:
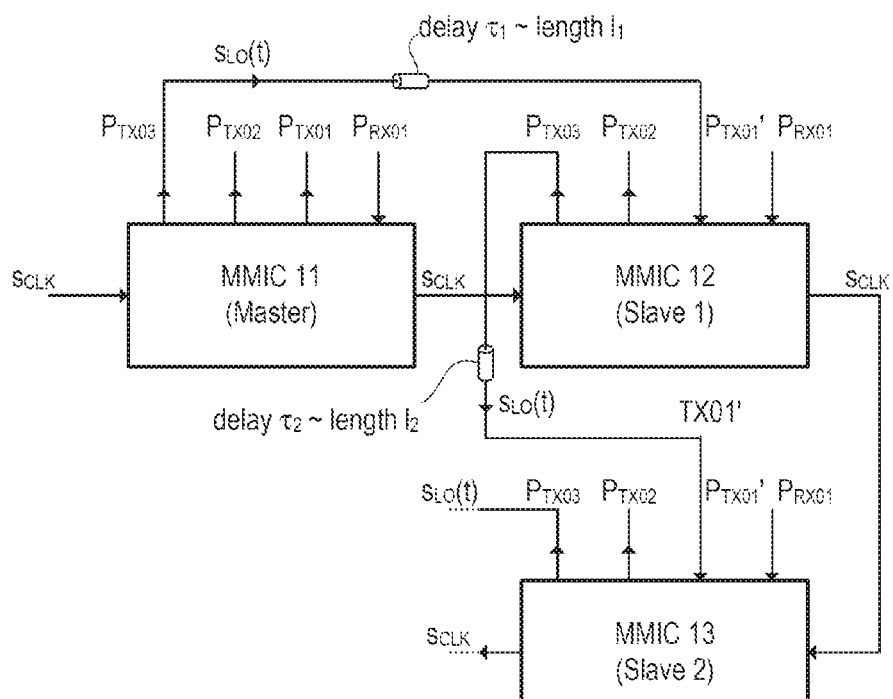
FIG. 5 illustrates one example of an MIMO radar system having a plurality of cascaded MMICs.

FIG. 5 is a block diagram which illustrates, by way of example, an MIMO radar system having a plurality of coupled (cascaded) MMICs. In the example illustrated, three MMICs are arranged on a carrier, for example a printed circuit board (PCB). Each MMIC may have a plurality of transmission channels TX01, TX02, TX03, etc. and a plurality of reception channels RX01, RX02, RX03, etc. (even if not all channels are depicted in FIG. 5). For the operation of the radar system, it is important that the LO signals used by the MMICs are coherent. Therefore, the LO signal is generated only in one MMIC, the master MMIC 11, and is forwarded to the slave MMICs 12 and 13.

In the example illustrated, each MMIC has output pins $P_{TX01}$, $P_{TX02}$, $P_{TX03}$, etc. which are assigned to TX channels TX01, TX02, TX03, etc. The input pins $P_{RX01}$, $P_{RX02}$, $P_{RX03}$, etc. are assigned to RX channels RX01, RX02, RX03, etc. ($P_{RX02}$ and $P_{RX03}$ are not shown in FIG. 5). The output pins $P_{TX01}$, $P_{TX02}$, $P_{TX03}$, etc. and the input pins $P_{RX01}$, $P_{RX02}$, $P_{RX03}$, etc. can each be coupled to transmission and reception antennas, respectively. If only a single MMIC is used, all RX and TX channels of the MMIC can be coupled to antennas. If—as in the case illustrated in FIG. 5—a plurality of MMICs are coupled, one MMIC is operated as the master and the remaining MMICs are operated as the slave. The master MMIC 11 generates the LO signal for all slave MMICs 12, 13. In the example illustrated, the LO signal $s_{LO}(t)$ generated in the master MMIC 11 is output at an output pin, for example the pin PTX03, and is supplied to the slave MMIC 12 via a line. The slave MMIC 12 receives the LO signal via the line (for example a stripline arranged on the printed circuit board) at an input pin. In order to avoid a separate input pin for the LO signal $s_{LO}(t)$, the output pin $P_{TX01}$ of the TX channel TX01 is configured as an input pin in the present example (and is therefore denoted $P_{TX01}'$). The manner in which an output pin of a TX channel can be configured as an input pin is explained in more detail later. Alternatively, an additional input pin may be provided for the purpose of receiving an externally generated LO signal, which is undesirable in some applications, however.

Figure 15:
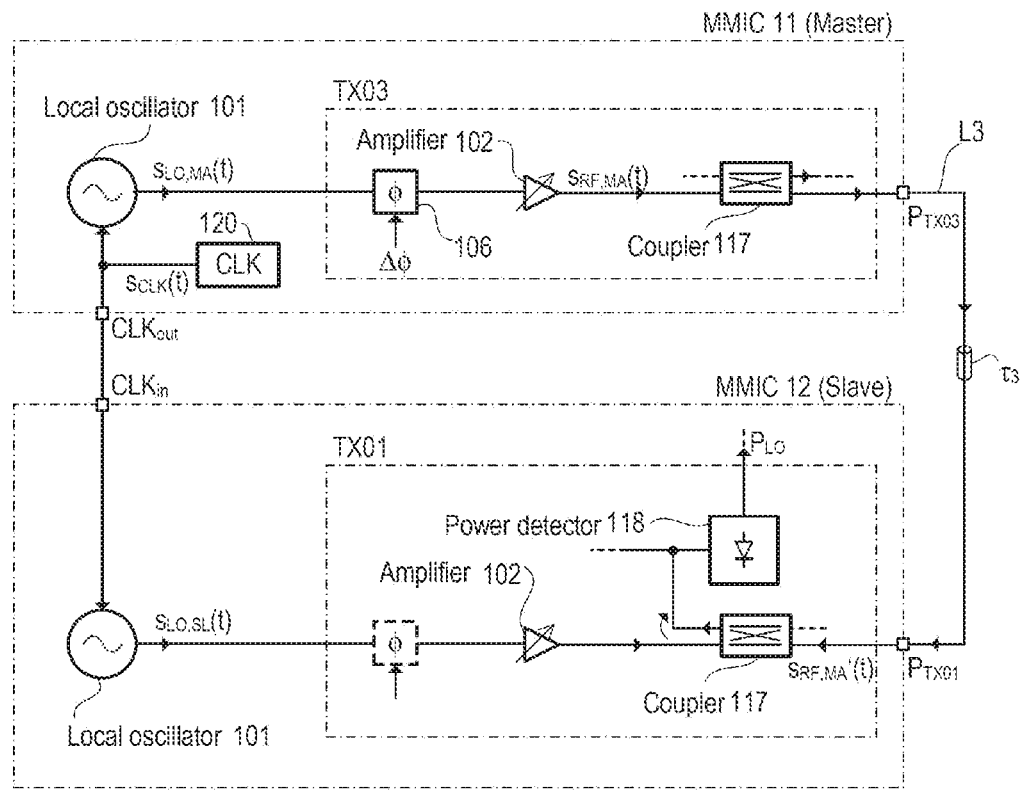
FIG. 15 illustrates a part of a radar system having two coupled MMICs, wherein only those components which are used to measure the power of the signal received in the slave MMIC are illustrated.

A slave MMIC can also forward "its" LO signal to a further slave, which makes it possible to cascade a master MMIC and a plurality of slave MMICs. In the example illustrated in FIG. 5, the master MMIC 11 generates the LO signal and forwards it to the slave MMIC 12 (via its pin $P_{TX0}'$) via the output pin $P_{TX03}$. In the same manner, the slave MMIC 12 forwards the LO signal (received from the master MMIC 11) to a further slave MMIC 13, as a result of which a plurality of MMICs can be connected in series (cascaded). The clock signal $s_{CLK}(t)$ is likewise forwarded from MMIC to MMIC, but separate clock pins are provided for this purpose (also see FIGS. 9c and 15). The (system) clock signal $s_{CLK}$ has a clock frequency of several MHz, whereas the LO signal has an LO frequency $f_{LO}$ of several GHz (for example 76-81 GHz). The clock generator (not illustrated) which generates the clock signal $s_{CLK}$ can be integrated, for example, in the master MMIC 11 (cf., for example, FIGS. 9c and 15) or can be arranged in a separate chip. In this case, the clock generator may contain an oscillating crystal, for example. The clock signal $s_{CLK}$ or a clock signal derived therefrom may be, for example, a reference clock for the local oscillators arranged in the MMICs 11, 12, 13 (cf. FIG. 4, local oscillator 101).

The transmission of the LO signal $s_{LO}(t)$ from one MMIC to the next MMIC is associated with a delay time which depends, inter alia, on the length of the lines between the MMICs. In the example illustrated in FIG. 5, the propagation delay of the LO signal $s_{LO}(t)$ between MMIC 11 and MMIC 12 is denoted $\tau_1$ and the propagation delay of the LO signal $s_{LO}(t)$ between MMIC 12 and MMIC 13 is denoted $\tau_2$. The propagation delays $\tau_1$ and $\tau_2$ each correspond to a line length $l_1$ and $l_2$ and to a phase shift $\varphi_1$ and $\varphi_2$, wherein the phase shift $\varphi$ is generally proportional to the delay time $\tau$ ($\varphi = 2\pi \cdot f_{LO} \cdot \tau$).

As already mentioned, the phase angle of the LO signals $s_{LO}(t)$ supplied to the slave MMICs is important for carrying out exact radar measurements. For example, it would be desirable for the mixers to receive the LO signal $s_{LO}(t)$ with a defined phase at the reference input in the RX channels (see FIG. 4, mixer 104). In some exemplary embodiments (for example if a plurality of TX channels are used in one chip), it may also be desirable to simultaneously synchronize the transmission signals supplied to the TX channels.

Figure 6:
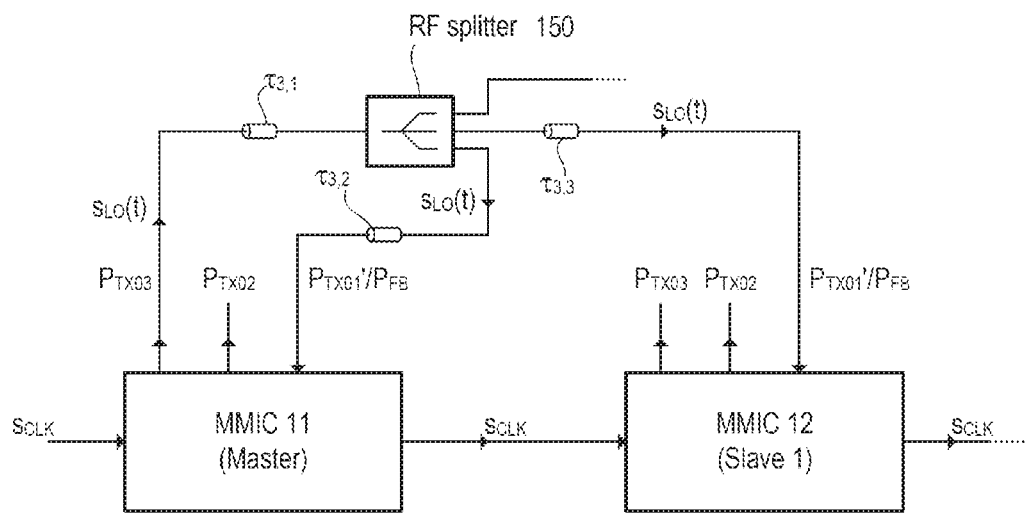
FIG. 6 illustrates one example of a radar system in which a master MMIC is coupled to at least one slave MMIC, wherein the local oscillator signal generated by the master MMIC is both supplied to the slave MMIC and fed back to the master MMIC.

FIG. 6 illustrates one example of a radar system having a plurality of MMICs which are arranged on a printed circuit board and are coupled in such a manner that (in theory) all RX channels in all MMICs (that is to say the mixers in the RX channels) "see" the LO signal with the same phase angle. According to the example from FIG. 6, the master MMIC 11 provides the LO signal $s_{LO}(t)$ at an output pin $P_{TX03}$ which, in the present example, is assigned to the output channel TX03 (in a similar manner to the example from FIG. 5). The output channel TX03 is therefore not connected to an antenna in order to emit a radar signal, but rather is used to transmit the LO signal SL(t) to the slave MMIC. Even though the use of an output channel to transmit the LO signal reduces the number of available channels, this has the advantage that a design change is not required since the TX channel is designed for RF frequencies and a dedicated RF signal output pin therefore does not have to be provided. In addition, scalability of the radar system can be achieved by using the TX channel to transmit the LO signal. However, if the MMIC is not used in a cascaded arrangement (for example in a stand-alone arrangement), the TX channel can be used as a complete TX channel for transmitting radar signals to an antenna. The output pin $P_{TX03}$ of the master MMIC 11 is connected to an input of an RF splitter 150 which may be arranged on the printed circuit board, like the MMICs. The line between the pin $P_{TX03}$ and the RF splitter causes a propagation delay of $\tau_{3,1}$.

The RF splitter splits the LO signal $s_{LO}(t)$ and provides an LO signal at the splitter outputs for each MMIC. In this case, one of the splitter outputs is coupled to a feedback input of the master MMIC 11 which is denoted TX01' (alternatively FB) and via which the LO signal $s_{LO}(t)$ is fed back to the master MMIC 11. The further splitter outputs are connected to the corresponding input pins of the slave MMIC, wherein only the slave MMIC 12 is illustrated in FIG. 6. The propagation delay from the RF splitter 150 to the master MMIC 11 is denoted $\tau_{3,2}$ and the propagation delay from the RF splitter 150 to the slave MMIC 12 is denoted $\tau_{3,3}$. If the lines from the outputs of the splitter 150 to the MMICs (i.e. master MMIC 11, slave MMIC 12, etc.) cause the same propagation delay ($\tau_{3,2} = \tau_{3,3}$), the LO signal arrives at the RX channels in all MMICs with (in theory) the same phases.

Figure 7:
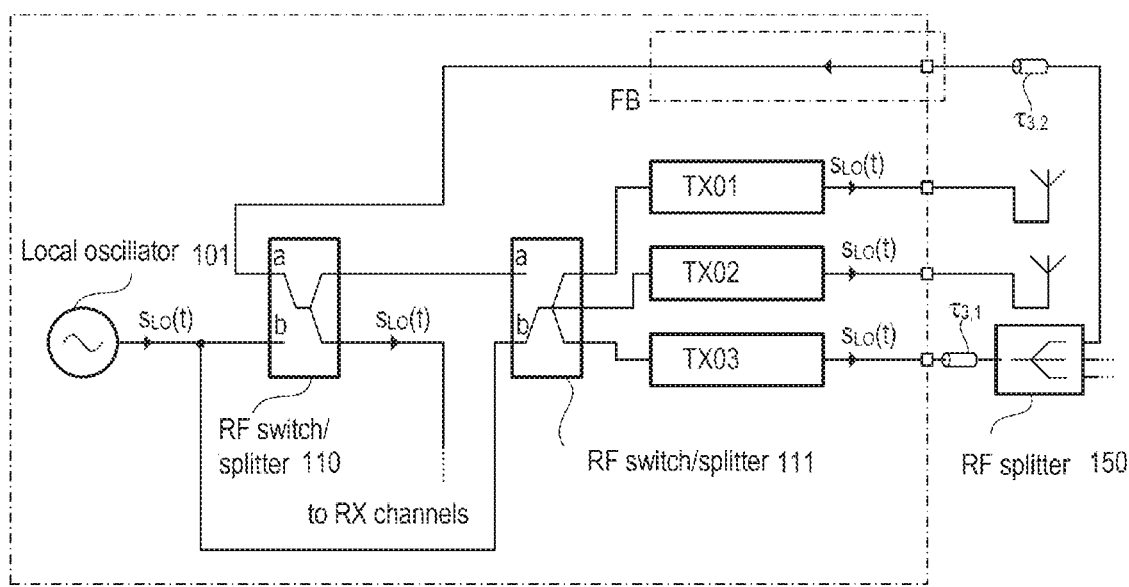
FIG. 7 illustrates an exemplary implementation of a radar system having a plurality of transmission channels which are arranged in a master MMIC with optional feedback of the oscillator signal.

FIG. 7 shows an exemplary implementation of the TX channels of an MMIC (for example the master MMIC 11) which enables coupling to further MMICs, as illustrated in FIG. 6. The MMIC 11 therefore comprises a local oscillator 101 (LO) which generates the LO signal $s_{LO}(t)$. This LO signal is supplied, on the one hand, to an input of a first RF switch/splitter 110 and, on the other hand, to an input of a second RF switch/splitter 111. The RF switches/splitters are substantially splitter components with selectable inputs which are respectively denoted a and b in the figures. Depending on the position of the (electronic) switch, the signal applied to the input a or the signal applied to the input b is forwarded to the outputs. The control signals for the electronic switches are not illustrated for the sake of simplicity. In the present example, the RF switch/splitter 111 is connected in such a manner that input b is selected and the LO signal $s_{LO}(t)$ is forwarded to the TX channels TX01, TX02, TX03, etc. The individual TX channels can be implemented as illustrated in FIG. 4, for example.

In FIG. 7, the output of the TX channel TX03 (in a similar manner to the example from FIG. 6) is not connected to an antenna, but rather to an external splitter 150 which can be arranged on the same carrier as the MMIC 11. The LO signal $s_{LO}(t)$ provided at the outputs of the splitter 150 is supplied to the various slave MMICs, wherein one output of the splitter 150 is fed back to a feedback pin $P_{FB}$ of the master MMIIC. The feedback channel FB coupled to the feedback pin $P_{FB}$ in the MMIC 11 is designed to pass the fed-back LO signal $s_{LO}(t)$ to a second input (input a) of the first RF switch/splitter 110. The feedback channel FB may have, for example, a buffer amplifier (LO buffer) which is not illustrated in the figures for the sake of clarity. One output of the first RF switch/splitter 110 can be connected to an input (input a) of the second RF switch/splitter 111, whereas the remaining outputs of the first RF switch/splitter 110 provide the LO signals for the RX channels. The propagation delays $\tau_{3,1}$ and $\tau_{3,2}$ illustrated in FIG. 7 correspond to the situation illustrated in FIG. 6.

As mentioned, FIG. 7 shows the master MMIC 11. The slave MMIC 12 (cf. FIG. 6) can have an identical structure, but the other input (input a) is selected in the second RF switch/splitter 111 in the slave MMIC 12. In this case, the internal LO 101 of the slave MMIC 12 is not used, but rather the LO signal $s_{LO}(t)$ fed back via the feedback channel FB is supplied both to the RX channels (via RF switch/splitter 110) and to the TX channels (via RF switch/splitter 111) of the slave MMIC 12. In the case of "stand-alone" operation of the MMIC 11 (without a connected slave MMIC), the input b is selected in the first RF switch/splitter 110 and the input b is likewise selected in the second RF switch/splitter 111 and the feedback channel FB is inactive. Chips of the same type can therefore be used in a cascaded radar arrangement in which the RF switch/splitter 111 transmits the LO signal to another chip. However, it also allows the chips to be used in a stand-alone arrangement in which all TX channels are used to transmit signals to antennas. In the case of the "stand-alone" operation of the MMIC 11, the switch position of the second RF switch/splitter 111 is strictly speaking not relevant since the LO signal from the local oscillator 101 is forwarded in both positions.

Figure 8:
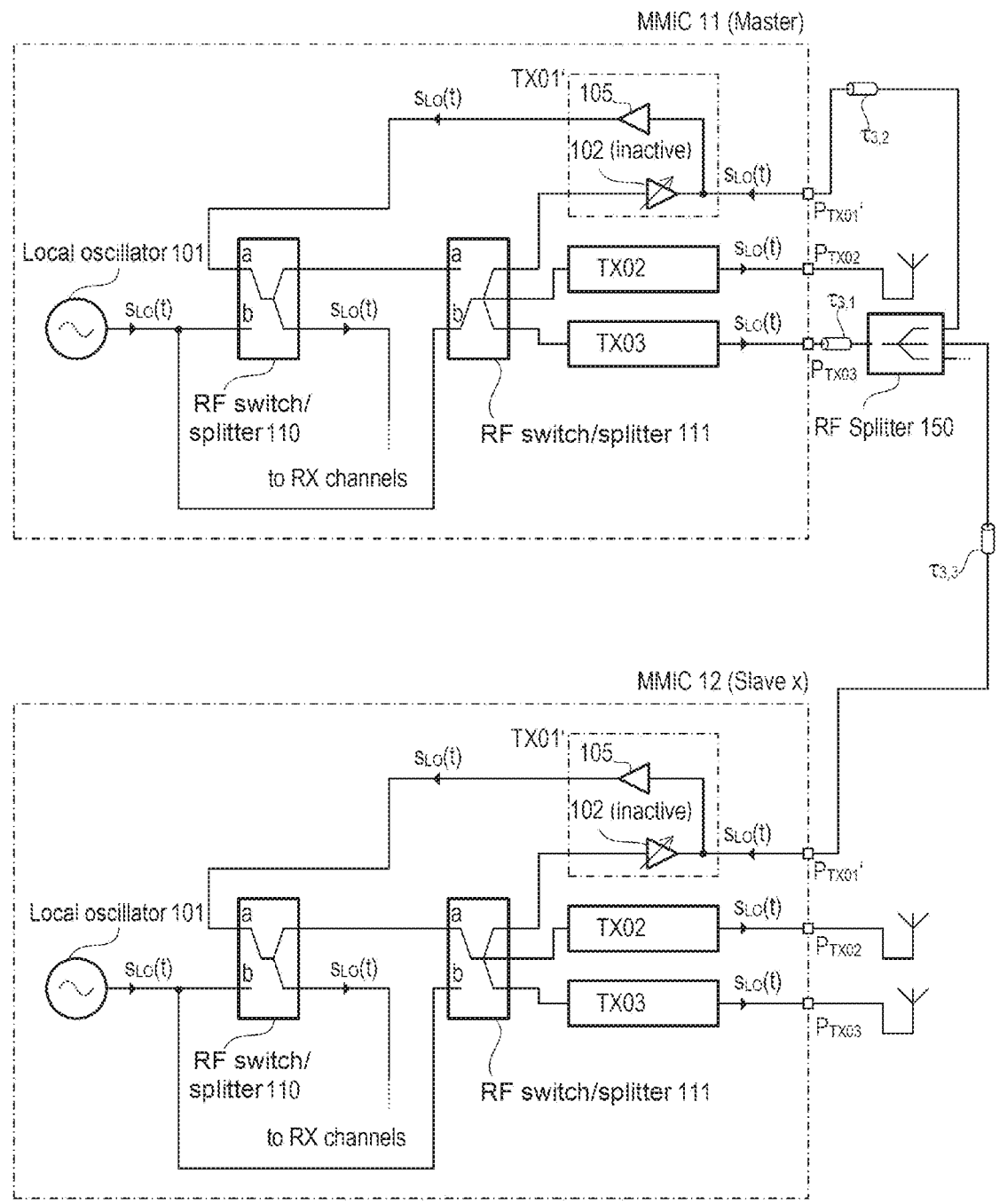
FIG. 8 illustrates a further exemplary implementation of a radar system having a plurality of transmission channels which are arranged in a master or slave MMIC with optional feeding of the local oscillator signal, wherein a TX channel can be configured as an input for the local oscillator signal.

FIG. 8 shows a similar example to FIG. 7, but at least one TX channel (for example the TX channel TX01) can be configured as a feedback channel. The TX channel TX01 configured as a feedback channel is denoted TX01' and receives, from the outside, the LO signal which was transmitted to the RF splitter 150 via the TX03 channel, wherein the signal output by the RF splitter is passed back to the TX01 channel again. This configurability of the TX channels enables more flexible use of the MMIC 11 and the additional feedback pin $P_{FB}$ is not required. Apart from the missing separate feedback channel (feedback pin $P_{FB}$), the MMICs 11, 12 in FIG. 8 are very similar to the MMIC 11 from FIG. 7. In some exemplary embodiments, if feedback of the LO signal is provided, the LO signal generated by the local oscillator 101 cannot be directly passed to the TX channels, but rather can be first externally fed to the outside to the splitter 150 and can then be fed back into the chip again, with the result that a delayed LO signal (in comparison with the LO signal directly present at the local oscillator 101) is ultimately used to generate the TX signal output to the antenna.

According to the example from FIG. 8, the MMIC 11 comprises a local oscillator 101 (LO) which generates the LO signal $s_{LO}(t)$. This LO signal is supplied, on the one hand, to an input of a first RF switch/splitter 110 and, on the other hand, to an input of a second RF switch/splitter 111. As in the example according to FIG. 7, the RF switches/splitters are substantially splitter components with selectable inputs which are respectively denoted a and b. Depending on the position of the (electronic) switch, the signal present at the input a or the signal present at the input b is forwarded to the outputs. The control signals for the electronic switches are not illustrated for the sake of simplicity. In the present example, the second RF switch/splitter 111 in the master MMIC 11 is connected in such a manner that input b is selected and the LO signal $s_{LO}(t)$ is forwarded from the LO 101 to the TX channels TX01, TX02, TX03, etc. In contrast, in the slave MMIC 12, the second RF switch/splitter 111 is connected in such a manner that input a is selected and the LO signal supplied from the outside via the channel TX01' is forwarded to the TX channels. Like in the previous example from FIG. 7, the first RF switch/splitter 110 (in both MMICs 11, 12) is connected (switch position a) in such a manner that the LO signal supplied from the outside via the channel TX01' is forwarded to the RX channels and also to an input of the second RF switch/splitter 111. The switch position b of the first RF switch/splitter 110 is required only for stand-alone operation in which an external LO signal is not supplied to the MMIC.

The text below explains how a TX channel can be configured as a feedback channel for feeding in an external LO signal. This explanation relates to both the master MMIC 11 and the slave MMIC 12. Therefore, a configurable TX channel (the TX channel TX01' in the present example) has an output path and an input path. An RF power amplifier 102 is arranged in the output path (in a similar manner to the example from FIG. 4). A buffer amplifier 105 (LO buffer) is arranged in the input path. The output of the RF power amplifier 102 and the input of the buffer amplifier 105 are connected to the pin $P_{TX01}$. Only one of the signal paths (input path or output path) is ever active. For this purpose, the RF power amplifier 102 and the buffer amplifier 105 can be alternately deactivated, with the result that the RF power amplifier 102 is active only when the buffer amplifier 105 is inactive and vice versa. The control signals for activating and deactivating the RF power amplifier 102 and the buffer amplifier 105 are not illustrated for the sake of simplicity.

If an LO signal $s_{LO}(t)$ is supplied to an MMIC from the outside via the pin $P_{TX01}$', the relevant channel (TX01' in the illustrated example) must be configured as an input and the buffer amplifier 105 is active, while the RF power amplifier 102 is inactive. The LO signal $s_{LO}(t)$ supplied to $P_{TX01}$' is passed, via the buffer amplifier 105, to the input of a splitter, in the present case to the input a of the RF switch/splitter 110 which forwards the received LO signal to the RX channels. If a TX channel is not configured as an input, the buffer amplifier 105 is inactive and only the RF power amplifier 102 of the relevant TX channel is active and the TX channel operates in the conventional manner (cf. FIG. 4) and can be connected to an antenna, for example. The TX channel TX01 can therefore be configured, with the result that it can be used either as a TX channel which externally outputs a signal (either to the antenna or as an LO signal to another chip), or receives (if configured as an input) an LO signal from the outside. The TX channel TX01 can therefore be configured in a bidirectional manner.

As can be seen in FIG. 8, the master MMIC 11 and the slave MMIC 12 have a substantially identical structure. Only the switch position of the second RF switch/splitter 111 in the slave MMIC 12 differs from that in the master MMIC 11. Since the LO signal $s_{LO}(t)$ generated by the local oscillator 101 is intended to be passed directly to the TX channels in the master MMIC 11, the input b is selected in the second RF switch/splitter 111. The LO signal supplied from the outside (fed back via the splitter 150) is divided only among the RX channels using the first RF switch/splitter 110. In the slave MMIC 12, the LO signal supplied from the outside (via the splitter 150) is intended to be used both for the TX channels and for the RX channels. For this reason, the input a is selected in the second RF switch/splitter 111 in the slave MMIC 12.

If the propagation delays $\tau_{3,2}$ and $\tau_{3,3}$ are the same, the RX channels of the master MMIC 11 and of the slave MMIC 12 "see" the LO signal $s_{LO}(t)$ (in theory) with the same phase.

Although this equality of the phases applies in theory to a symmetrical connection (that is to say $\tau_{3,2}=\tau_{3,3}=\ldots$) of the master MMIC and slave MMICs according to FIGS. 7 and 8, it is difficult to achieve with sufficient accuracy in practice since the propagation delays $\tau_{3,2}$ and $\tau_{3,3}$—and therefore also the phase—of the LO signals arriving at the RX channels can change over the course of time on account of temperature changes. As mentioned, unknown phase changes can have a negative effect on the result of the radar measurements. For this reason, it may be useful to measure, in addition or as an alternative to the symmetrical connection between the master MMIC and the slave MMIC according to FIGS. 7 and 8, the propagation delay (or the phase shift) of the LO signal $s_{LO}(t)$ between two coupled MMICs and to then take into account the measured delay in the radar measurement. The propagation time determination described below can therefore be carried out both in a symmetrical structure and in a non-symmetrical structure, that is to say a structure in which the RF splitter 150 is not used, for example.

Figure 9A:
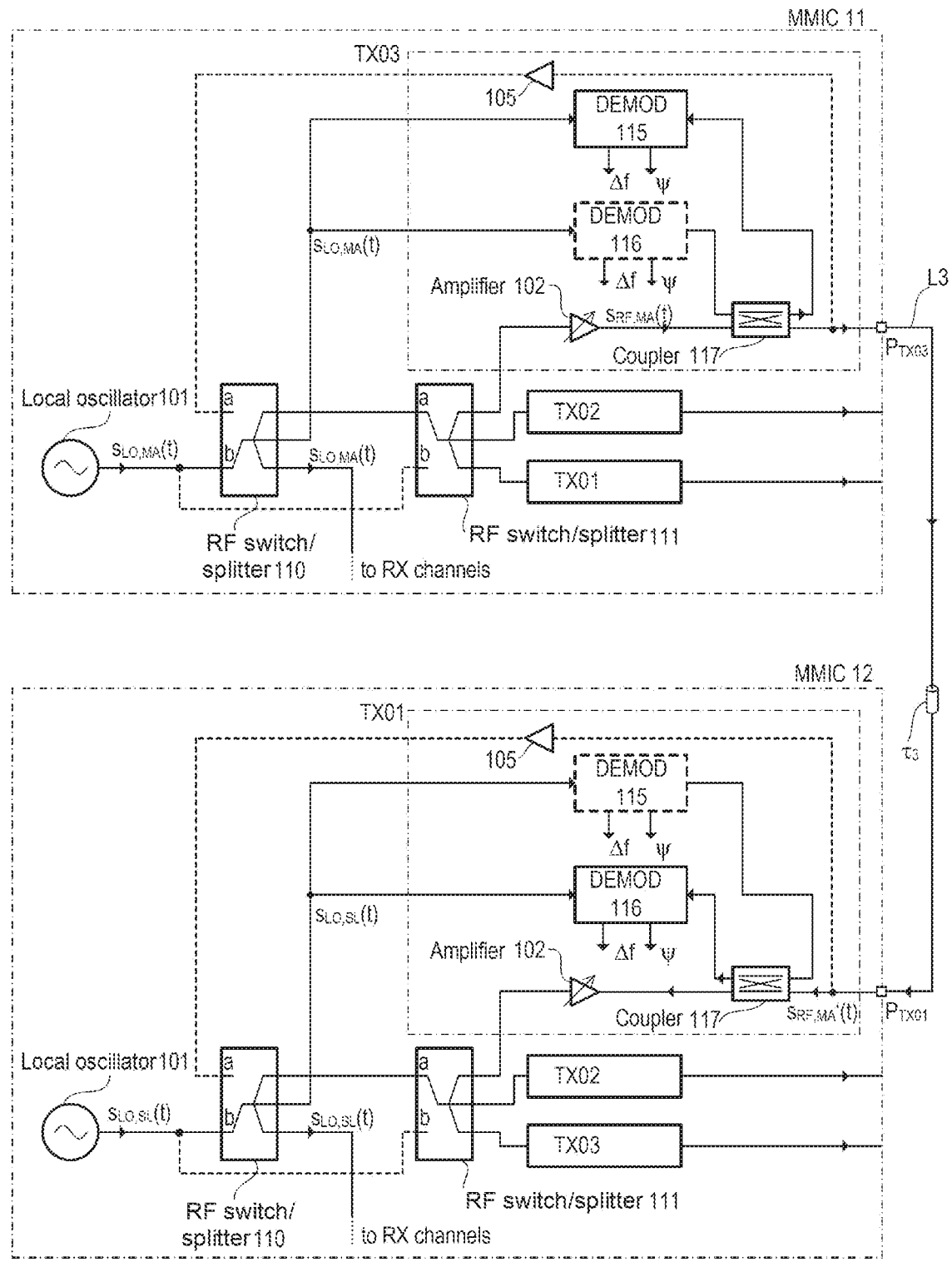
FIGS. 9A-9C illustrate a radar system having two coupled MMICs, wherein at least one transmission channel respectively has a circuit for detecting the phase and (optionally) frequency of the local oscillator signal, where
Figure 9B:
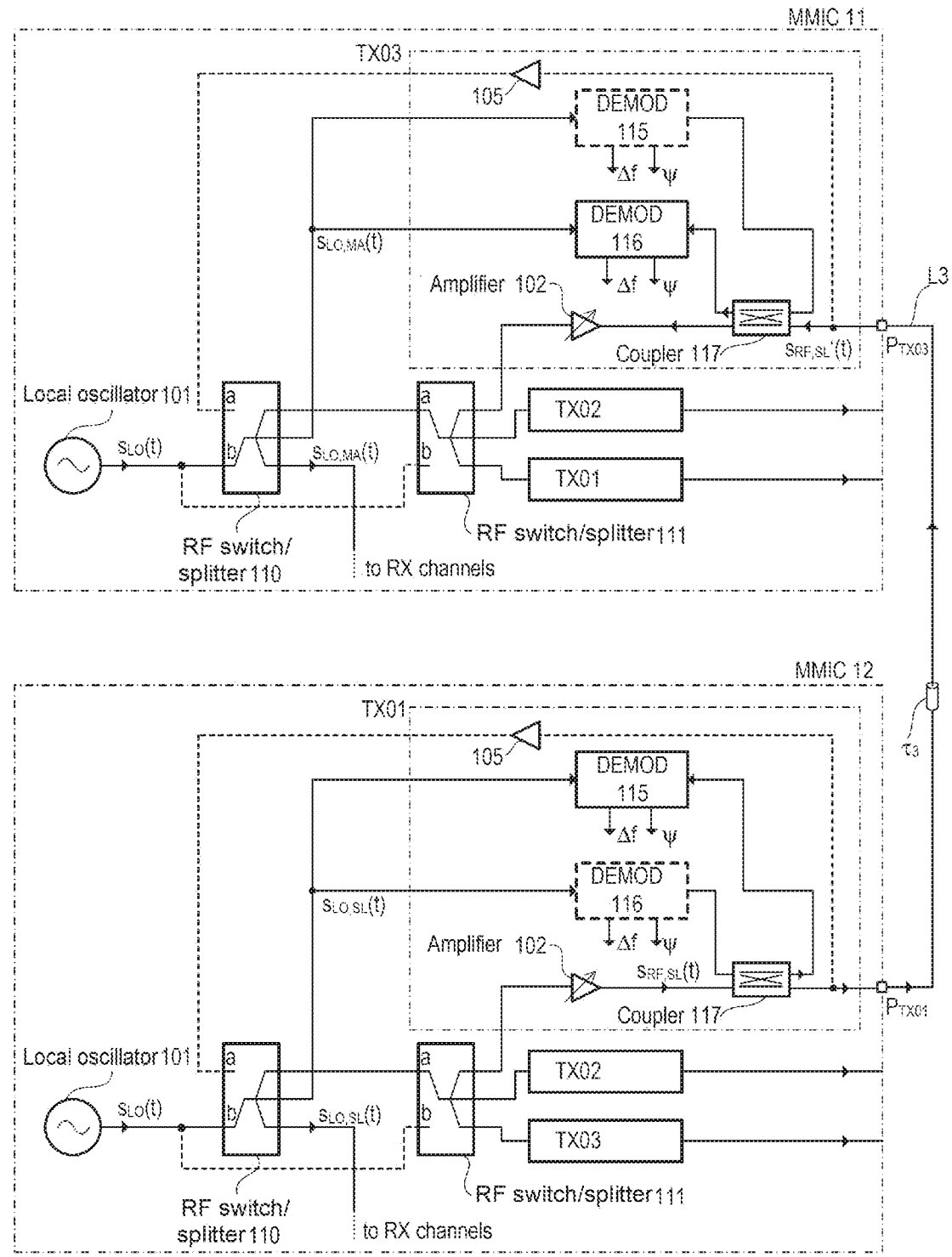

FIGS. 9A and 9B show examples of an MMIC having a plurality of TX and RX channels, wherein the TX channels are designed to determine a propagation delay $\tau_3$ or a phase shift between a first MMIC (for example master MMIC 11) and a second MMIC (for example slave MMIC 12), wherein this determination of the propagation delay can be carried out in a bidirectional manner (from the first MMIC to the second MMIC and vice versa) in order to eliminate asymmetries on account of different temperatures of the MMICs and on account of delays of the clock signal $s_{CLK}(t)$ between the MMICs. FIG. 9A relates to the case of transmitting signals from the MMIC 11 to the MMIC 12 via the line L3 and FIG. 9B relates to the reverse case of transmitting signals from the MMIC 12 to the MMIC 11. The MMIC 11 in FIGS. 9A-9C has substantially the same structure as in the previous example according to FIG. 8, wherein the TX channels each have two demodulators 115 and 116 and a coupler 117 in FIGS. 9A-9C.

Figure 9C:
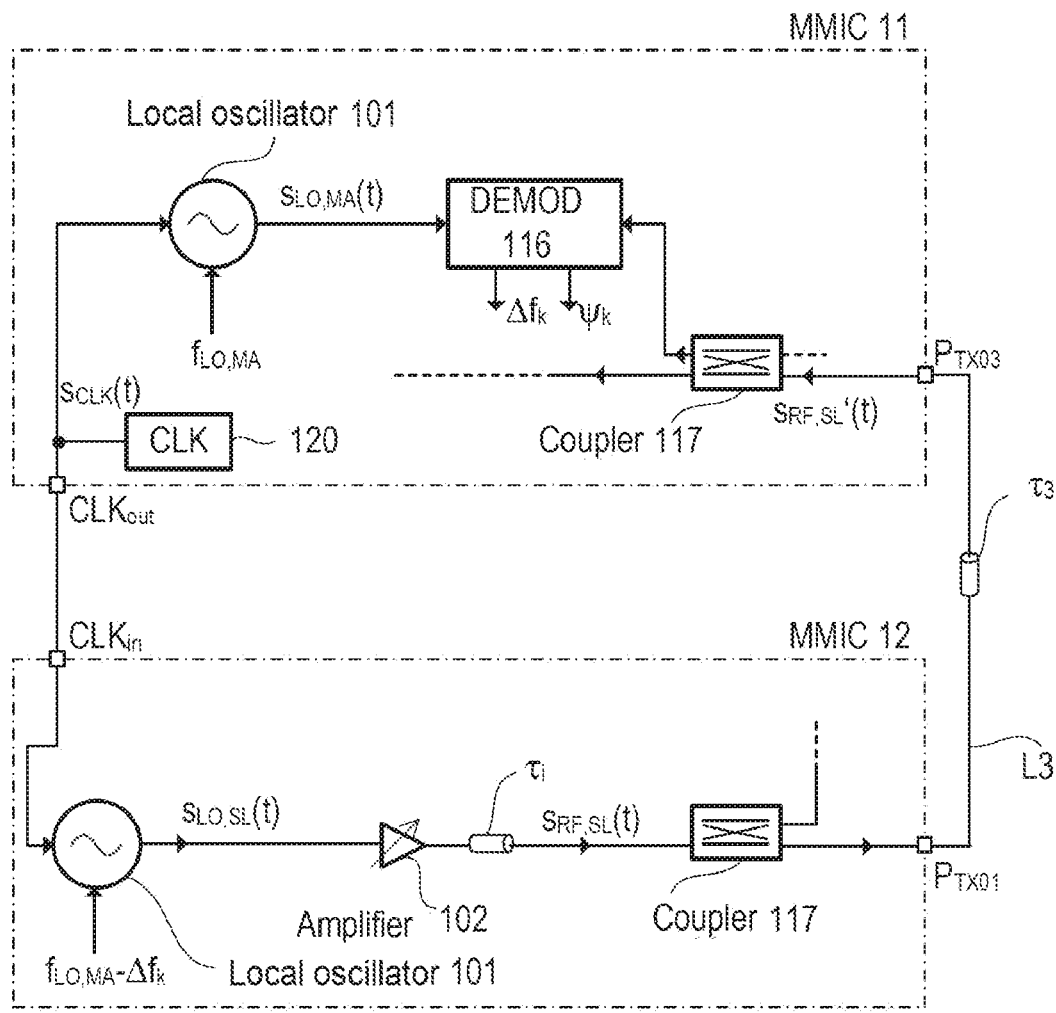

In the TX channels, the coupler 117 is connected between the RF power amplifier 102 and the output pin of the respective TX channel (pins $P_{TX01}$ and $P_{TX03}$ in FIGS. 9A-9C). The coupler is also connected to the demodulators 115 and 116 in such a manner that a part (of the power) of the output signal from the relevant TX channel is supplied to the RF input of the demodulator 115 (that is to say a part of the output signal from the amplifier 102) and a part (of the power) of the signal arriving at the output pin of the respective TX channel is supplied to the RF input of the demodulator 116. The LO signal $s_{LO}(t)$ is supplied to the reference inputs of the demodulators 115 and 116 via the splitter 110. The master MMIC and the slave MMIC may have a substantially identical structure. For the sake of clarity, only the TX channel TX03 is illustrated in more detail for the master MMIC 11 and only the TX channel TX01 is illustrated in more detail for the slave MMIC 12 in FIGS. 9A and 9B. In the example from FIGS. 9A-9C, the TX channels can be configured as an input, like in FIG. 8, but this is optional in this example. Therefore, the feedback paths with the buffer amplifiers 105 are depicted using dashed lines.

In the present example, the output signal from the RF amplifier 102 of the master MMIC 11 is denoted $s_{RF,MA}(t)$ and the output signal from the RF amplifier 102 of the slave MMIC 12 is denoted $s_{RF,SL}(t)$. Similarly, the LO signal from the master MMIC 11 is denoted $s_{LO,MA}(t)$ and the LO signal from the slave MMIC 12 is denoted $s_{LO,SL}(t)$. The signals $s_{RF,MA}(t)$ and $s_{RF,SL}(t)$ are each amplified and phase-shifted versions of the LO signals $s_{LO,MA}(t)$ and $s_{LO,SL}(t)$. The signal from the master MMIC 11 arriving at the slave MMIC 12 is denoted $s_{RF,MA}'(t)$ (see FIG. 9A). Similarly, the signal from the slave MMIC 12 arriving at the master MMIC 11 is denoted $s_{RF,SL}'(t)$ (see FIG. 9B). The phase shift between $s_{RF,MA}(t)$ and $s_{RF,MA}'(t)$ is determined substantially by the propagation delay $\tau_3$. Similarly, the phase shift between $s_{RF,SL}(t)$ and $s_{RF,SL}'(t)$ is determined substantially by the propagation delay $\tau_3$. In addition to the propagation delay $\tau_3$, delays of the clock signals $s_{CLK}$ (see FIG. 5, clock $s_{CLK}$ in the MMIC 12 is slightly delayed in comparison with the clock $s_{CLK}$ in the MMIC 11) and temperature differences in the individual MMICs 11, 12, etc. can also play a role since temperature changes even inside the individual MMICs can result in changes in the phases.

The output signals from the demodulators 115 and 116 in the MMICs 11 and 12 are supplied to a control unit (for example a microcontroller, not shown in FIG. 9A). The output signals from the demodulators are supplied to the control unit (possibly by means of analog-to-digital converters), and the control unit is designed to carry out the calculations needed to determine the propagation delay $\tau_3$. For this purpose, the control unit may have a processor which can be programmed by means of software instructions to carry out the calculations mentioned. The control unit can be arranged either in one of the MMICs (for example the master MMIC 11) or in a separate control chip (for example a microcontroller which can be arranged on the same printed circuit board as the MMICs 11, 12). The MMICs 11, 12 and the control unit can be coupled to a serial data line, for example, for the purpose of interchanging digital data.

Figure 10:
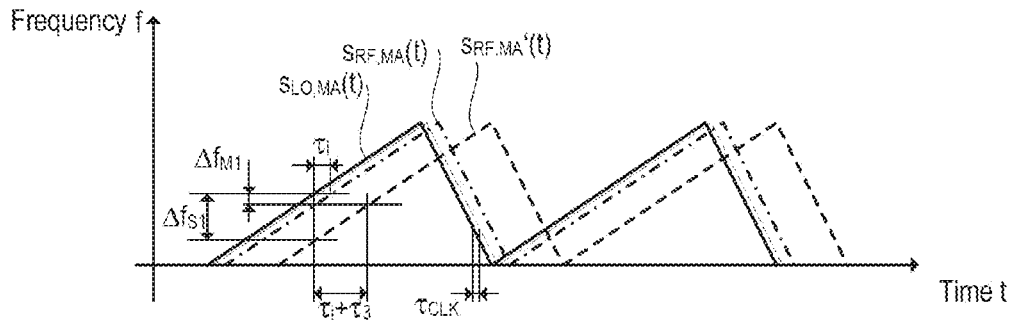
FIG. 10 illustrates one example of a measurement of the propagation delay of the LO signal from a master MMIC to a slave MMIC.

There are various possible ways of determining the propagation delay $\tau_3$ and the associated phase shift with the aid of the circuit configuration illustrated in FIGS. 9A-9C. According to the present example, the local oscillator 101 in the master MMIC 11 is used to generate a chirp signal as an LO signal $s_{LO,MA}(t)$ (frequency ramp). In the master MMIC 11, this chirp signal is passed, on the one hand, to the reference input of the demodulator 115 via the splitter 110 and is passed (inter alia) to the RF amplifier 102 in the TX channel TX03 via the splitters 110 and 111. The output signal $s_{RF,MA}(t)$ from the amplifier 102 is passed, on the one hand, to the RF input of the demodulator 115 and, on the other hand, to the pin $P_{TX03}$ of the master MMIC 11 via the coupler 117. The signal output at the pin $P_{TX03}$ of the master MMIC 11 arrives at the pin $P_{TX01}$ of the slave MMIC 12 as a delayed signal $s_{RF,MA}'(t)$ and is forwarded in the slave MMIC 12 to the demodulator 116 via the coupler 117. This signal flow corresponds to the case shown in FIG. 9A. In FIG. 10, the LO signal (chirp signal) $s_{LO,MA}(t)$ is depicted as a solid line, the signal $s_{RF,MA}(t)$ is depicted as a dash-dotted line and the signal $s_{RF,MA}'(t)$ is depicted as a (thick) dashed line (the thin dashed line is discussed later).

As illustrated in FIG. 10, the internal propagation delay in the master MMIC 11 is $\tau_i$ (that is to say the propagation time from the LO 101 to the splitter 110) and the external propagation delay from the coupler 117 in the master MMIC 11 to the coupler 117 in the slave MMIC 12 is $\tau_3$. The entire propagation delay is therefore $\tau_i + \tau_3$. The differential frequency $\Delta f_{M1}$ is determined with the aid of the demodulator 115 in the master MMIC 11 and the differential frequency $\Delta f_{S1}$ (beat frequency) is determined with the aid of the demodulator 116 in the slave MMIC 12. These differential frequencies $\Delta f_{M1}$ and $\Delta f_{S1}$ can be easily converted into corresponding delay times $\tau_i$ and $\tau_i + \tau_3$ by means of the ramp gradient K=df/dt (in Hz/s) of the frequency ramp. In the present example, the propagation delay $\tau_3$ results from the equation:

$$\tau_3 = (\Delta f_{S1} - \Delta f_{M1})/K. \quad (1)$$

Figure 11:
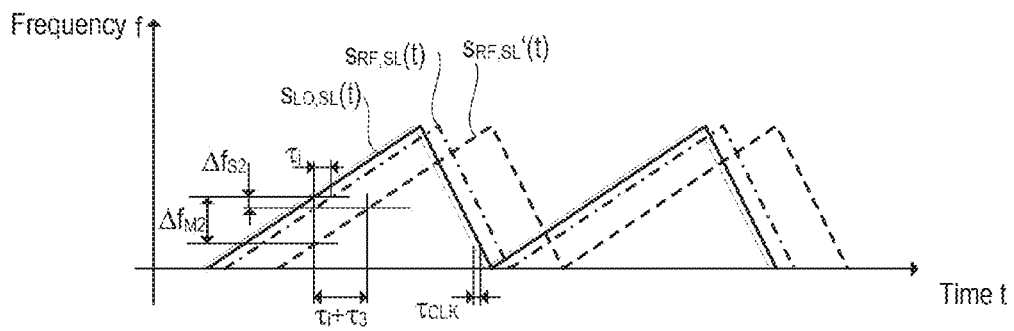
FIG. 11 illustrates the measurement of the propagation delay of the LO signal from a slave MMIC to a master MMIC, corresponding to FIG. 10.

The graph from FIG. 11 illustrates the converse case according to FIGS. 9A-9C. According to the present example, the local oscillator 101 in the slave MMIC 12 is used to generate a chirp signal as an LO signal $s_{LO,SL}(t)$ (frequency ramp). In the slave MMIC 12, this chirp signal is passed, on the one hand, to the reference input of the demodulator 115 via the splitter 110 and is passed (inter alia) to the RF amplifier 102 in the TX channel TX01 via the splitters 110 and 111. The output signal $s_{RF,SL}(t)$ from the amplifier 102 is passed, on the one hand, to the RF input of the demodulator 115 and, on the other hand, to the pin $P_{TX01}$ of the slave MMIC 12 via the coupler 117. The signal output at the pin $P_{TX01}$ of the slave MMIC 12 arrives at the pin $P_{TX03}$ of the master MMIC 11 as a delayed signal $s_{RF,SL}'(t)$ and is forwarded in the master MMIC 11 to the demodulator 116 via the coupler 117. This signal flow corresponds to the case shown in FIG. 9B. In FIG. 11, the LO signal (chirp signal) $s_{LO,SL}(t)$ is depicted as a solid line, the signal $s_{RF,SL}(t)$ is depicted as a dash-dotted line and the signal $s_{RF,SL}'(t)$ is depicted as a (thick) dashed line.

As illustrated in FIG. 11, the internal propagation delay in the slave MMIC 12 is $\tau_i$ (that is to say the propagation time from the LO 101 to the splitter 110) and the external propagation delay from the coupler 117 in the slave MMIC 12 to the coupler 117 in the master MMIC 11 is $\tau_3$ (the entire propagation delay is $\tau_i + \tau_3$). The differential frequency $\Delta f_{S2}$ is determined from the demodulated baseband or intermediate frequency signal with the aid of the demodulator 115 in the slave MMIC 12 and the differential frequency $\Delta f_{M2}$ (beat frequency) is determined from the demodulated baseband or intermediate frequency signal with the aid of the demodulator 116 in the master MMIC 11. As in the previous case, these differential frequencies $\Delta f_{S2}$ and $\Delta f_{M2}$ can be accordingly easily converted into corresponding delay times $\tau_i$ and $\tau_i + \tau_3$ by means of the ramp gradient K of the frequency ramp. In the present example, the propagation delay $\tau_3$ results from the equation (similar to equation 1):

$$\tau_3 = (\Delta f_{M2} - \Delta f_{S2})/K. \quad (2)$$

In theory, the same value would have to be calculated in both cases (for both signal flow directions) for the propagation delay $\tau_3$. However, in practice, it is not possible to disregard the fact that the frequency ramps (LO signals) $s_{LO,MA}(t)$ and $s_{LO,SL}(t)$ cannot be triggered at the same time, but rather the frequency ramp in the slave MMIC 12 always lags behind the corresponding frequency ramp in the master MMIC 11 on account of a propagation delay $\tau_{CLK}$ of the clock signal $s_{CLK}$ (see FIG. 5), also referred to as a clock delay. As illustrated in FIG. 6, the clock signal is distributed to the individual MMICs via a separate line. The clock signal therefore has a propagation delay which differs from the LO signal in the slave MMIC. In FIG. 10, the thin dashed line illustrates the signal $s_{LO,SL}(t)$ in the slave MMIC 12 and, in FIG. 11, the thin dashed line illustrates the signal $s_{LO,MA}(t)$ in the master MMIC 11. The clock delay results in the differential frequency $\Delta_{M2}$ (see FIG. 11) in the master MMIC 12 being systematically measured to be too large and the differential frequency $\Delta f_{S1}$ (see FIG. 10) in the slave MMIC 12 being systematically measured to be too small. As a result, the effect of the clock delay is very similar to the effect of the Doppler shift when measuring the distance using an FMCW radar system. The systematic error mentioned can be eliminated by forming the average of the propagation time measurement in both directions (corresponding to FIGS. 9A and 9B). Consequently, the propagation delay $\tau_3$ results from averaging equations 1 and 2:

$$\tau_3 = (\Delta f_{S1} + \Delta f_{M2} - \Delta f_{M1} - \Delta f_{S2})/(2K). \quad (3)$$

The clock delay $\tau_{CLK}$ can be determined in a similar manner from the difference between equations 1 and 2. The phase shift $\varphi_3$ belonging to the propagation delay $\tau_3$ follows from the equation $\varphi_{93} = 2\pi \cdot f_{LO} \cdot \tau_3$.

An alternative approach to determining the propagation delay $\tau_3$ and the phase shift $\varphi_3$ with the aid of the system from FIGS. 9A-9C is explained below. In contrast to the previously described example in which chirp signals are used as LO signals for measuring the phase shift $\varphi_3$ (and the propagation delay $\tau_3$), LO signals at a defined frequency are used in the following example. The following example can also be carried out using a system according to FIGS. 9A-9C and differs from the previously described example only in the evaluation of the signals.

In the present example, the local oscillator in the master MMIC 11 is operated at a frequency $f_{LO,MA} = f_{LO} + \Delta f$, whereas the local oscillator in the slave MMIC 12 is operated at a frequency $f_{LO,MA} = f_{LO}$. The differential frequency or the frequency offset $\Delta f$ should be selected to be so small that the associated wavelength $\lambda$ is greater than the line length L3 between the MMICs 11 and 12. The wavelength is calculated according to $\lambda = c/\Delta f$, where c is the propagation speed of the LO signals via the line arranged on the printed circuit board between the MMICs 11 and 12. Since the propagation speed and the approximate line length L3 are known, the frequency offset can be set accordingly. Therefore, $\Delta f < c/L3$.

First of all, $\Delta f = \Delta f_1$ is selected as the frequency offset. If the signal flow direction from the master MMIC 11 to the slave MMIC 12 is considered (see FIG. 9A), the phase of the outgoing signal $s_{RF,MA}(t)$ at the output of the TX channel TX03 (that is to say at the coupler 117 in the master MMIC 11) is measured by means of the demodulator 115, from which the propagation delay Ti inside the chip can again be determined in a similar manner to that in the previous example. The signal $s_{RF,MA}'(t)$ transmitted by the master MMIC 11 and arriving at the slave MMIC 12 is supplied to the demodulator 116 in the slave MMIC 12 via the coupler 117 in the TX channel TX01, wherein the demodulation in the slave MMIC 12 is carried out using the LO signal $s_{LO},SL(t)$ (frequency $f_{LO,SL} = f_{LO,MA} - \Delta f_1$). The demodulator 116 provides, at its outputs, an output signal having the differential frequency $\Delta f_1$ and the associated phase $$\psi_1 = 2\pi \cdot \Delta f_1 \cdot (\tau_i + \tau_3), \quad (4)$$

from which the propagation delay $\tau_3$ can be easily determined. This situation is illustrated in the upper graph in FIG. 12 in which the signal generated in the master MMIC 11 and demodulated in the slave MMIC 12 is illustrated. In order to verify this measurement, it is repeated with a different frequency offset $\Delta f = \Delta f_2$ (cf. lower graph in FIG. 12). In the present example, the frequency offset is reduced by 25%, as a result of which the phase $$\psi_2 = 2\pi \cdot \Delta f_2 \cdot (\tau_i + \tau_3) \quad (5)$$

is also accordingly reduced at the output of the modulator 112 in the slave MMIC 12 (see FIG. 9A) since the propagation delay $(\tau_i + \tau_3)$ remains the same. If the phase $\psi_2$ does not change in proportion to the frequency, a sudden phase change from 360 to zero degrees has occurred and the measurement is not unambiguous. This can happen when the frequency offset Δf does not match the line length L3.

As in the previous example, the measurement can also be carried out in a bidirectional manner in the present case and the signal flow from the slave MMIC 12 to the master MMIC 11 can also be considered (see FIG. 9B). Errors which are caused by dissimilar on-chip propagation delays in the MMICs 11 and 12, for example, can be compensated for by averaging the measurement results obtained for different signal flow directions.

More reliable results are obtained using a differential approach. That is to say, only phase changes are considered. If the difference between equation 5 and equation 4 is formed, the following is obtained $$\psi_2 - \psi_1 = 2\pi \cdot (\Delta f_2 - \Delta f_1) \cdot (\tau_i + \tau_3). \quad (6)$$

In the case of a multiplicity of measurements with different frequency offsets, a multiplicity of equations similar to equation 6 are obtained, which equations in practice usually form an overdetermined system of equations since the equations will not be linearly dependent on account of noise, measurement errors, etc. This system of equations $$\psi_k - \psi_1 = 2\pi \cdot (\Delta f_k - \Delta f_1) \cdot (\tau_i + \tau_3), \text{ for } k=2, \ldots N, \quad (7)$$

can be solved using known methods in order to obtain a solution for the propagation delay $\tau_i + \tau_3$, for example on the basis of the least squares concept. In another example, the results for the propagation delay $\tau_i + \tau_3$ can be averaged.

FIG. 9C is a simplified version of the example from FIG. 9B in which all of those components which are not required for the measurement according to equations 6 and 7 have been omitted. As mentioned, the local oscillators in the two MMICs 11 and 12 are set to different frequencies, wherein the local oscillator in the slave MMIC 12 oscillates at a frequency $F_{LO,SL}$ which is lower than the frequency $f_{LO,MA}$ of the local oscillator in the master MMIC 11 by a frequency offset $\Delta f_k$. The amplified (and phase-shifted owing to the propagation delay $\tau_i$ inside the chip) local oscillator signal $s_{LO,SL}(t)$ is output by the slave MMIC 12 as an RF signal $s_{RF,SL}(t)$ at the chip contact $P_{TX01}$ (pin or solder ball) and is transmitted to the chip contact $P_{TX03}$ of the master MMIC 11 via the line L3. The RF signal $s_{RF,SL}'(t)$ arriving at the master MMIC 11 is additionally phase-shifted on account of the propagation delay $\tau_3$ of the line L3 and is supplied, via the coupler 117, to the demodulator 116 which demodulates (demodulator 116) the signal $s_{RF,SL}'(t)$ using the local oscillator signal $s_{LO,MA}(t)$ generated in the master MMIC 11. As mentioned, the demodulator 116 provides measured values for the frequency offset $\Delta f_k$ and, in particular, for the phase $\psi_k$. These measured values can be evaluated according to equation 7 in order to calculate the propagation delay $\tau_i + \tau_3$. The propagation delay Ti inside the chip can be separately measured, as described, and can be considered to be known for the calculation of $\tau_3$. The measurement can be repeated for a multiplicity of frequency offsets $\Delta f_k$, in which case the master MMIC 11 and the slave MMIC 12 swap roles.

Figure 12:
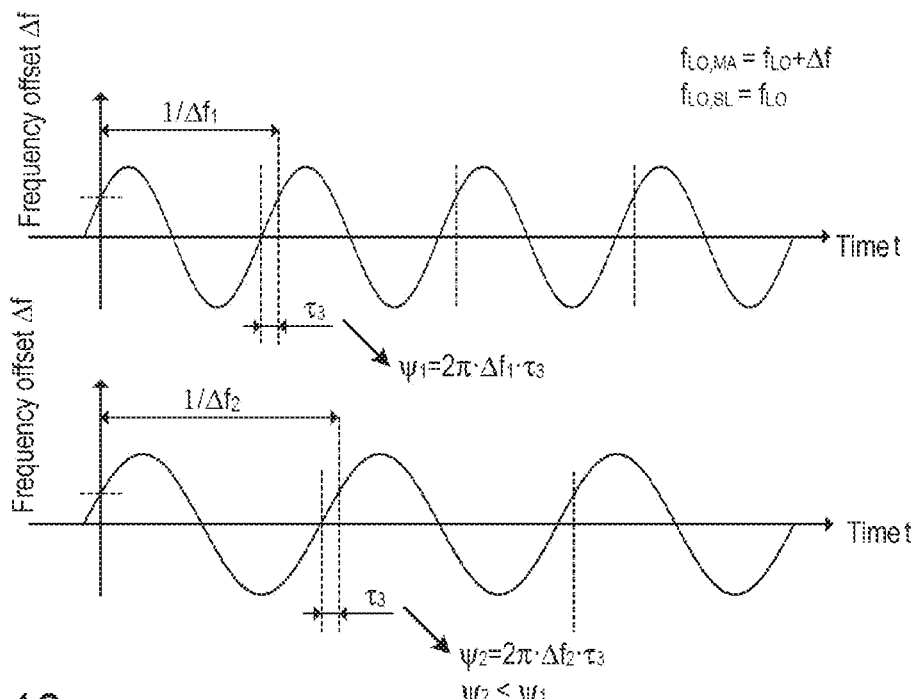
FIG. 12 illustrates another example of the measurement of the propagation delay of the LO signal from a master MMIC to a slave MMIC (and vice versa).
Figure 13:
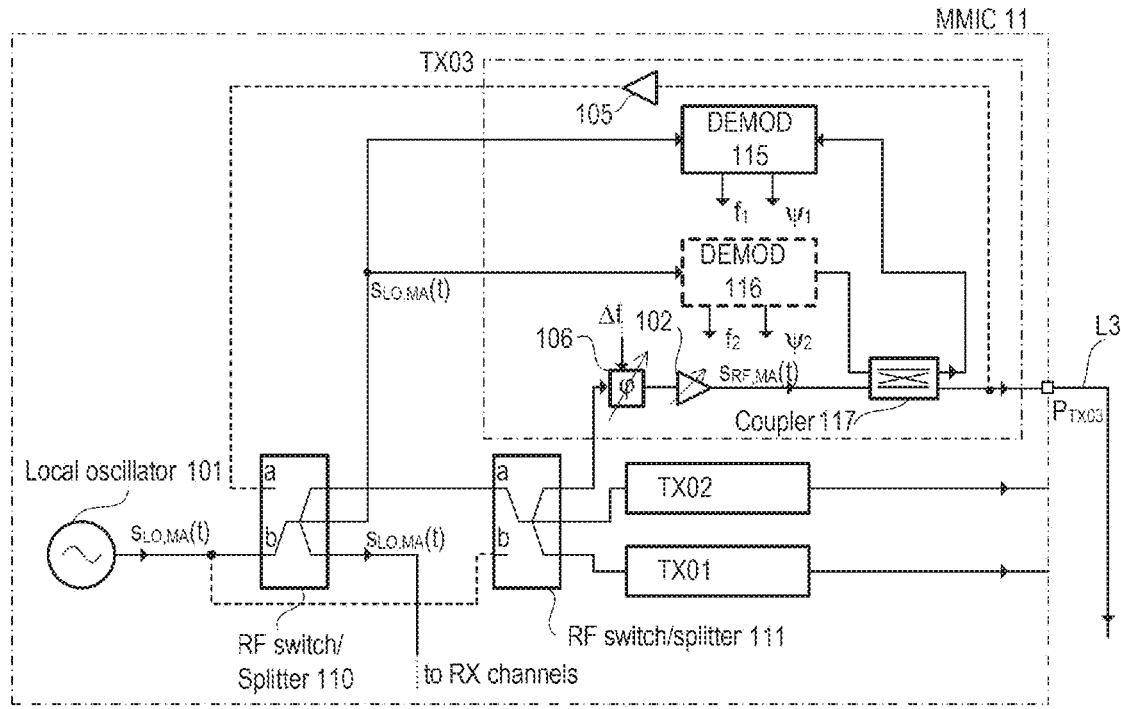
FIG. 13 illustrates another example of an MMIC which has substantially the same structure as the MMICs in FIGS. 9A-9C, but with an additional phase modulator in the TX channel.

FIG. 13 illustrates a master MMIC 11 which is substantially identical to the example from FIG. 9A but has an additional phase modulator 106 connected upstream of the RF power amplifier 102 in the TX channels. The frequency offset Δf mentioned above with respect to FIG. 12 can also be achieved by means of phase modulation of the LO signal $s_{LO,MA}(t)$ instead of changing the frequency of the local oscillator itself. This modulation frequency Δf appears at the output of the demodulator during demodulation in the slave MMIC 12 and the associated phase shift provides information on the propagation delay $\tau_3$ sought.

Figure 14:
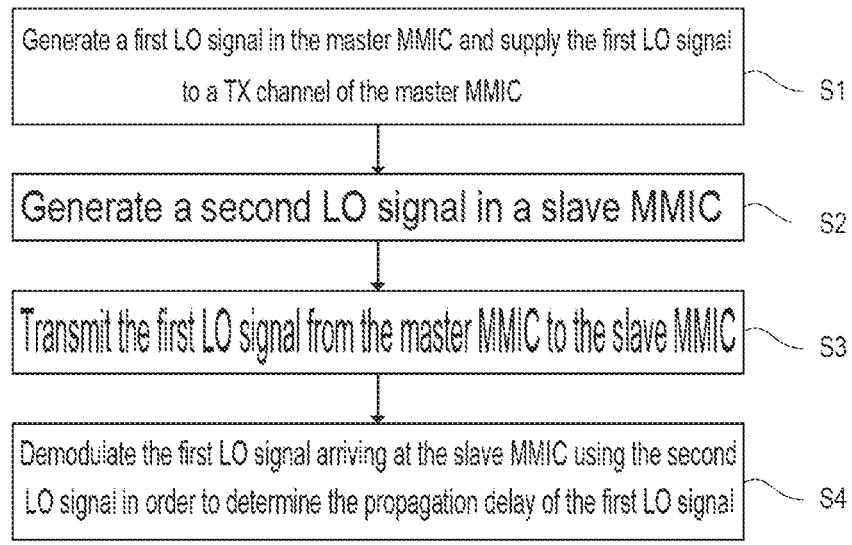
FIG. 14 illustrates an exemplary illustration of a method for detecting the propagation delay or phase shift of an LO signal during transmission from a first (for example master) MMIC to a second (for example slave) MMIC.

FIG. 14 uses a flowchart to illustrate a general example of a method for determining the propagation delay or phase shift of an LO signal during transmission from a first (for example master) MMIC to a second (for example slave) MMIC or vice versa. This method can be carried out, for example, using the radar systems which are illustrated in FIGS. 7-9 and 13 and have a plurality of coupled MMICs. According to FIG. 14, the method comprises generating a first RF oscillator signal in a first chip (see, for example, FIG. 9A, LO signal $s_{LO,MA}(t)$ in MMIC 11). This first RF oscillator signal is supplied to a TX channel of the first chip (see FIG. 14, step S1). At the output of the TX channel, the first RF oscillator signal already has a phase shift on account of the propagation delay inside the chip. In FIG. 9A, this phase-shifted first RF oscillator signal at the output of the TX channel TX03 is denoted $s_{RF,MA}(t)$. The method also comprises generating a second RF oscillator signal in a second chip (see FIG. 14, step S3, and, for example, FIG. 9A, LO signal $s_{LO,SL}(t)$ in MMIC 12). The first RF oscillator signal is transmitted from the first chip to the second chip via a transmission line (see FIG. 14, step S3). This transmission results in a propagation delay and therefore also a phase shift. In FIG. 9A, this first RF oscillator signal arriving at the MMIC 12 is denoted $s_{RF,MA}'(t)$. The method finally comprises determining a propagation delay of the first RF oscillator signal arriving at the second chip by means of demodulation using the second RF oscillator signal (see FIG. 14, step S3). In FIG. 9A, this demodulation is carried out by the demodulator 116 in the slave MMIC 12, for example. In the examples described above, the propagation delay sought is denoted $\tau_3$ and can be determined according to equation 3 or from the phase shift illustrated in FIG. 12, for example.

As already mentioned with respect to FIGS. 9A and 9B, the method can be carried out in a bidirectional manner. In this case, the signal from the second RF oscillator is supplied to a TX channel of the respective other chip, with the result that the second RF oscillator signal from the second chip (cf. FIG. 9B, MMIC 12) is transmitted to the first chip (cf. FIG. 9B, MMIC 11) via the same transmission line as in the reverse case. A propagation delay of the second RF oscillator signal arriving at the first chip is determined by means of demodulation using the first RF oscillator signal. In FIG. 9B, this demodulation is carried out by the demodulator 116 in the master MMIC 11, for example. The actual propagation delay can be determined on the basis of the two propagation delay values previously determined for different signal flow directions, for example by means of averaging according to equation 3.

The first and second RF oscillator signals may be either chirp signals (as illustrated in FIGS. 10 and 11, for example) or RF signals with an adjustably constant frequency (as illustrated in FIG. 12, for example). In the case of chirp signals, the first RF oscillator signal (for example generated in the master MMIC) contains at least one frequency ramp and the second RF oscillator signal (for example generated in the master MMIC) contains at least one corresponding frequency ramp. As mentioned above, two corresponding frequency ramps may have a delay relative to one another, which delay corresponds to the clock delay. In this case, the first propagation delay is determined on the basis of a first beat frequency which results from the demodulation of the first RF oscillator signal arriving at the second chip using the second RF oscillator signal. The propagation delay is effected for the reverse signal flow direction and the effect of the clock delay can be eliminated by means of averaging. Furthermore, the average clock delay can be determined by averaging the difference between the first and second cases. This procedure is similar to the determination of speed and distance in the FMCW triangulation method. In this method, the distance would represent the propagation delay $\tau_3$ here and the speed would represent the clock delay.

When using RF signals with a static (adjustably constant) frequency, the first RF oscillator signal may have a first frequency and the second RF oscillator signal may have a second frequency which differs from the first frequency by a defined frequency offset. This frequency offset can be generated by detuning the local oscillator in one of the two MMICs (cf. FIGS. 9A and 9B, oscillator 101) or by means of phase modulation of one of the two RF oscillator signals (cf example from FIG. 13, phase modulator 106). In this case, the first propagation delay can be determined on the basis of a phase which is assigned to the frequency offset and results from the demodulation of the first RF oscillator signal arriving at the second chip using the second RF oscillator signal. This measurement can be repeated for at least one further frequency offset. For this purpose, the frequency offset can be changed and an accordingly changed phase can be measured (cf. FIG. 12, phases $\psi_1$ and $\psi_2$). The measurements can again be carried out in a bidirectional manner.

Some aspects of the radar systems described here are summarized below. It goes without saying that this is not a complete, but rather only an exemplary, summary of technical features. One example of a radar system is suitable for implementing the method described above. According to this exemplary embodiment, the system comprises a first chip having a first RF contact (cf., for example, FIG. 9A, MMIC 11, pin $P_{TX03}$) and a second chip having a second RF contact (cf., for example, FIG. 9A, MMIC 12, pin $P_{TX01}$). A first RF oscillator is integrated in the first chip and has an output which is coupled to the first RF contact via at least one TX channel. A second RF oscillator is integrated in the second chip. The system also comprises a transmission line (cf., for example, FIG. 9A, line L3 with propagation delay $\tau_3$) which connects the first RF contact on the first chip to the second RF contact on the second chip. At least one first demodulator is arranged in the second chip. This demodulator has an RF input which is coupled to the second RF contact as well as a reference input which is coupled to an output of the second RF oscillator. The first RF oscillator is designed to generate a first RF oscillator signal which is transmitted to the RF input of the first demodulator via the first RF contact, the transmission line and the second RF contact. A control unit (controller) is designed to determine a first propagation delay of the first RF oscillator signal arriving at the second chip on the basis of information obtained from the first demodulator (for example according to equation 3 or on the basis of the phase shifts illustrated in FIG. 12).

Another exemplary embodiment relates to the case of a symmetrically structured radar system with feedback of the LO signal to the master MMIC, as illustrated in FIGS. 6 to 8. According to the examples described here, the radar system comprises a carrier (for example a printed circuit board, PCB), a first chip and at least one second chip which are arranged on the carrier. The first chip has an RF oscillator which is designed to generate an RF oscillator signal and to output it at a first RF output contact. The system also has an RF splitter arranged on the carrier. The RF splitter has an input and a first output and at least one second output. A first transmission line connects the RF output contact of the first chip to the input of the RF splitter. A second transmission line connects the first output of the RF splitter to an RF input of the first chip (cf., for example, FIG. 8, feedback of the RF oscillator signal to the master MMIC 11). A third transmission line connects the second output of the RF splitter to an RF input of the second chip (cf., for example, FIG. 8, transmission of the RF oscillator signal to the slave MMIC 12). In this case, the second and third transmission lines are configured in such a manner that they cause the same propagation delay during operation when transmitting the RF oscillator signal.

During operation, the RF oscillator signal can be transmitted to the RF splitter via the RF output contact of the first chip and the first transmission line and can be fed back to the first chip via the second transmission line and the RF input of the first chip. The first chip may contain an integrated RF splitter which is designed to forward the fed-back RF oscillator signal to the reception channels contained in the first chip. Similarly, the second chip may have an integrated RF splitter which is designed to forward the RF oscillator signal received via the RF input of the second chip to the reception and transmission channels contained in the second chip.

With respect to the examples of radar systems having a plurality of MMICs, as explained above, it may also be desirable to measure the power of the LO signal arriving in a slave MMIC (and generated in the master MMIC). In the example from FIG. 9A and also in the example shown below in FIG. 15, this LO signal arriving in the slave MMIC 12 is denoted $s_{RF,MA}'(t)$. According to FIG. 15, this arriving LO signal $s_{RF,MA}'(t)$ in the slave MMIC 12 is supplied, via the coupler 17 which is arranged in the vicinity of the chip contact $P_{TX01}$ of the slave MMIC 12, (inter alia) to a power detector 118 which is designed to generate and output a measured value representing the power of the supplied signal (for example as a DC voltage signal). Such RF power detectors generally comprise one or more diodes and are known per se and are therefore not explained any further here.

In practice, situations may arise in which the signal power of the signal $s_{RF,MA}'(t)$ arriving at the slave MMIC 12 is too low for the RF power detector 118 to be able to generate a reliable measured value (with a sufficient signal-to-noise ratio). In order to improve the situation, the local oscillator 101 is also activated in the slave MMIC 12 and generates the LO signal $s_{LO,SL}(t)$ which is likewise supplied to the coupler 117, wherein the frequencies $f_{LO}$ of the two LO signals $s_{LO,SL}(t)$ and $s_{RF,MA}'(t)$ are the same for this measurement. The coupler 117 is designed in such a manner that a part of the power of the LO signal $s_{LO,SL}(t)$ is likewise forwarded to the RF power detector 118, which results in the LO signals $s_{LO,SL}(t)$ and $s_{RF,MA}'(t)$ being superimposed at the input of the RF power detector 118. The average power of the sum signal $s_{LO,SL}(t)+s_{RF,MA}'(t)$ depends on the phase difference $\Delta\phi$ of the two signals which can be varied, for example, using the phase shifter 106 in the channel TX03 of the master MMIC 11. Additionally or alternatively, a phase shifter in the channel TX01 of the slave MMIC 12 can also be used to vary the phase difference $\Delta\phi$.

It is assumed for the following considerations that the LO signals $s_{RF,MA}'(t)$ and $s_{LO,SL}(t)$ can be modeled as follows:

$$s_{RF,MA}'(t)=A_{MA}\cos(2\pi\cdot f_{LO}\cdot t+\Delta\phi+\phi_{MA}'), \qquad (8)$$

$$s_{LO,SL}(t)=A_{SL}\cos(2\pi\cdot f_{LO}\cdot t+\phi_{SL}). \qquad (9)$$

Figure 16:
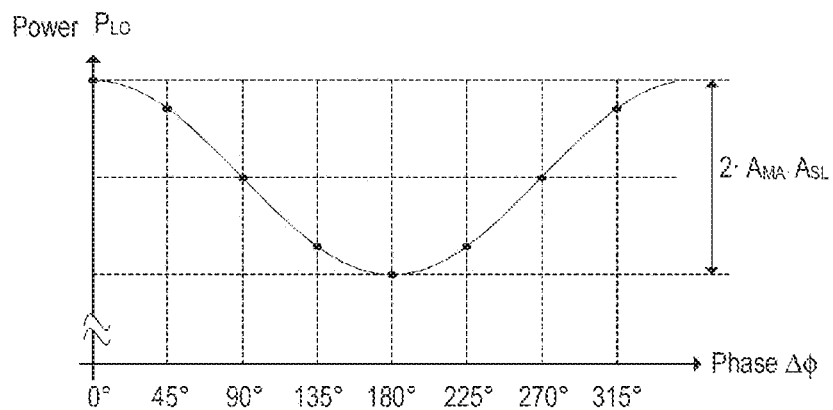
FIG. 16 is a graph for illustrating the measured values obtained during the power measurement.

In this case, the phases $\phi_{MA}'$ and $\phi_{SL}$ can be assumed to be zero without restricting generality. The instantaneous power of the sum signal is proportional to the square of the sum signal $s_{LO,SL}(t)+s_{RF,MA}'(t)$, wherein the RF power detector 118 measures the temporal average of the instantaneous power. This temporal average is therefore $$P_{LO}=1/T\int_0^T(s_{LO,SL}(t)+s_{RF,MA}'(t))^2 dt=$$

$$=\tfrac{1}{2}(A_{MA}^2+A_{SL}^2)+A_{MA}\cdot A_{SL}\cdot\cos(\Delta\phi), \qquad (10)$$

whereas the sought power of the LO signal $s_{RF,MA}'(t)$ transmitted from the master MMIC 11 to the slave MMIC 12 is equal to $A_{MA}^2$. It is noted at this point that the power $P_{LO}$ of the sum signal is significantly higher than the power $A_{MA}^2$ of the signal $s_{RF,MA}'(t)$ alone. Furthermore, the power $P_{LO}$ is a function of the phase shift $\Delta\phi$. A technique of how the power $A_{MA}^2$ can be determined with sufficient accuracy from a number of measured values $P_{LO}$ is presented below, wherein the measured values $P_{LO}$ are recorded in the case of different phase shifts. In a general example, N measured values $P_{LO}$ are recorded, wherein the phase shift $\Delta\phi$ is increased by $2k\pi/N$ before each measured value (k is an integer value of greater than or equal to 1). In the following example, k=1 (one period) and N=8 are assumed. In this case, eight measured values which are uniformly distributed over one period of a cosine curve are obtained. These eight measured values are illustrated in FIG. 16, by way of example. It goes without saying that the analog output voltage of the power detector 118 can be digitized before the digital further processing. However, a suitable analog-to-digital converter is not illustrated in the figures for the sake of clarity.

With k=2 and N=8, eight measured values each with a phase increment of 90° (2·2·π/8 rad) and therefore two periods of the cosine curve are obtained. The amplitude $A_{MA}\cdot A_{SL}$ of the cosine term $A_{MA}\cdot A_{SL}\cdot\cos(Ac)$ from equation 10 can be calculated from the measured values in a simple manner using a discrete Fourier transform. If the number of measured values is a power of two (for example 4, 8, 16, 32, etc.), the calculation can be carried out efficiently using the FFT algorithm (Fast Fourier Transformation). If the measured values represent only one period of a cosine curve (k=1), the value sought is the second value of the spectrum calculated (for example by means of FFT) (the first value would be the DC component). In the case of two periods (k=2), the sought value is the third value of the calculated spectrum, etc. It is pointed out at this point that the FFT is only one example of many possible algorithms. However, the FFT algorithm can be implemented in a comparatively simple manner in hardware.

Figure 17:
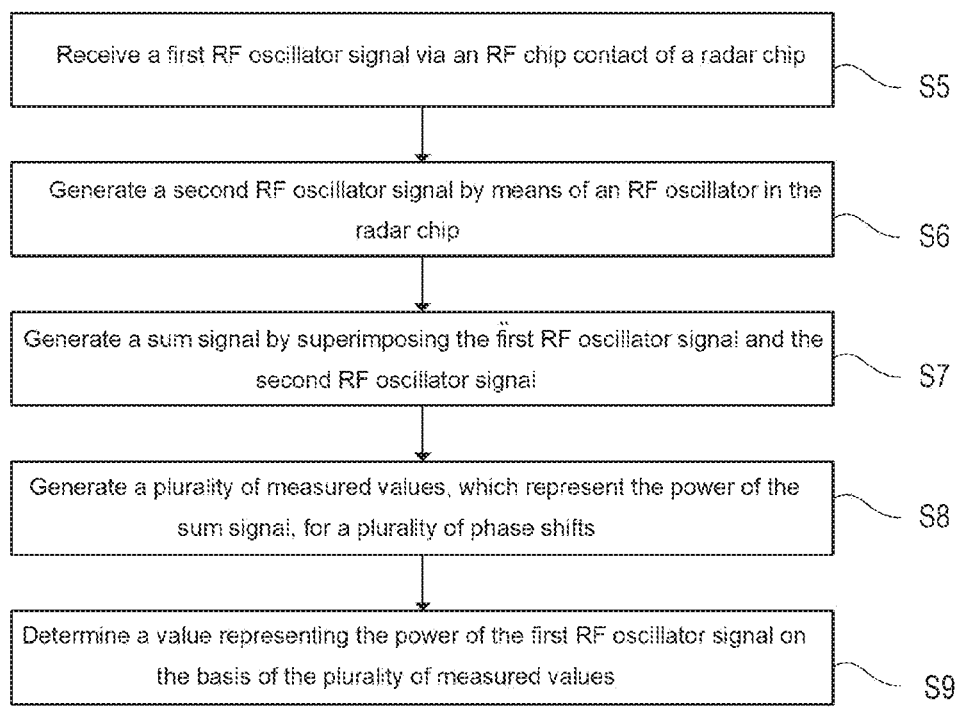
FIG. 17 is a flowchart for illustrating one example of a method for measuring the power of an LO signal received in a (for example slave) radar chip.

FIG. 17 is a flowchart for illustrating one example of a method for measuring the power of a first RF oscillator signal received in a radar MMIC (see FIG. 17, step S5). The first RF oscillator signal may be, for example, the LO signal generated in a master MMIC and transmitted to a slave MMIC; the slave MMIC receives the LO signal which is denoted $s_{RF,MA}(t)$ in the example from FIG. 15. In the radar MMIC, a second RF oscillator signal can be generated using a local oscillator, wherein the first RF oscillator signal and the second RF oscillator signal have the same frequency but have an adjustable phase shift relative to one another (see FIG. 17, step S6). In the example from FIG. 15, this second RF oscillator signal is the LO signal $s_{LO,SL}(t)$ generated in the slave MMIC 12. The first RF oscillator signal and the second RF oscillator signal are superimposed at an input of an RF power detector, thus forming the sum signal $s_{LO,SL}(t)+s_{RF,MA}(t)$ (See FIG. 17, step S7). A multiplicity of measured values representing the power of the sum signal are generated using the RF power detector (cf. FIG. 15, power detector 118), wherein a particular phase shift is assigned to each of the measured values (see FIG. 17, step S8). The power of the first RF oscillator signal is then determined on the basis of the multiplicity of measured values (see FIG. 17, step S9). This may comprise the Fourier transform of the measured values, for example. As already explained further above with reference to FIG. 16, the phase shifts assigned to the measured values may be equidistant and may be uniformly distributed over one or more full phase rotations (that is to say 3600 corresponds to 27 rad), which allows the further processing of the measured values by means of a Fourier transform. If the phase shifts are distributed over one full phase rotation (for example 00°, 45°, 90°, 135°, 180°, 225°, and 315°), as in the graph from FIG. 16, the second "bin" (spectral value) of the discrete Fourier transform represents the power value sought (cf. equation 10). The first bin represents the DC component, as already mentioned further above.

Although exemplary embodiments have been described and illustrated with reference to one or more implementations, changes and/or modifications can be made to the examples illustrated without departing from the spirit and scope of the accompanying claims. In particular, with regard to the different functions performed by the components or structures described above (units, assemblies, apparatuses, circuits, systems, etc.), the designations (including the reference to a "means") which are used to describe such a component should also correspond to any other component or structure which performs the specified function of the described component (that is to say which is functionally equivalent) even if it is not structurally equivalent to the disclosed structure which performs the function in the exemplary implementations described here.

What is claimed is:

1. A radar system, comprising:
   a first chip having a first radio frequency (RF) contact;
   a second chip having a second RF contact;
   a first RF oscillator that is integrated in the first chip and has an output that is coupled to the first RF contact via at least one transmission (TX) channel;
   a second RF oscillator integrated in the second chip;
   a transmission line that connects the first RF contact on the first chip to the second RF contact on the second chip;
   at least one first demodulator that is arranged in the second chip and has a first RF input and a first reference input, wherein the first RF input is coupled to the second RF contact and the first reference input is coupled to an output of the second RF oscillator; and
   a controller,
   wherein the first RF oscillator is configured to generate a first RF oscillator signal that is transmitted to the first RF input of the at least one first demodulator via the first RF contact, the transmission line, and the second RF contact, and
   wherein the controller is configured to determine a first propagation delay of the first RF oscillator signal arriving at the second chip on a basis of information obtained from the at least one first demodulator.

2. The radar system as claimed in claim 1, wherein:
   the second RF oscillator has an output that is coupled to the second RF contact via at least one further TX channel,
   at least one second demodulator is arranged in the first chip and has a second RF input and a second reference input, wherein the second RF input is coupled to the first RF contact and the second reference input which is coupled to an output of the first RF oscillator, the second RF oscillator is configured to generate a second RF oscillator signal that is transmitted to the second RF input of the at least one second demodulator via the second RF contact, the transmission line, and the first RF contact, and the controller is configured to determine a second propagation delay of the second RF oscillator signal arriving at the first chip on a basis of information obtained from the at least one second demodulator.

3. The radar system as claimed in claim 2, wherein the controller is configured to determine a propagation delay assigned to the transmission line on a basis of the first propagation delay and the second propagation delay.

4. The radar system as claimed in claim 1, wherein the first RF oscillator signal has at least one frequency ramp and the second RF oscillator signal has a corresponding frequency ramp.

5. The radar system as claimed in claim 4, wherein the controller is configured to determine the first propagation delay on a basis of a first beat frequency that results from a demodulation of the first RF oscillator signal arriving at the second chip using the second RF oscillator signal.

6. The radar system as claimed in claim 1, wherein the first RF oscillator signal has a first frequency and the second RF oscillator signal has a second frequency that differs from the first frequency by a defined frequency offset.

7. The radar system as claimed in claim 6, wherein the controller is configured to determine the first propagation delay on a basis of a phase which is assigned to the frequency offset and results from the demodulation of the first RF oscillator signal arriving at the second chip using the second RF oscillator signal.

8. The radar system as claimed in claim 6, wherein, in order to determine the first propagation delay, the controller is configured to:

determine two phases, which are a result of a demodulation of the first RF oscillator signal arriving at the at least one first demodulator, for two corresponding frequency offsets, calculate a phase difference from the two phases and an associated frequency offset difference, and calculate the first propagation delay on a basis of the phase difference and the associated frequency offset difference.

\* \* \* \* \*